(12) United States Patent
Shino et al.

(10) Patent No.: US 10,972,620 B2
(45) Date of Patent: Apr. 6, 2021

(54) INFORMATION PROCESSING APPARATUS CAPABLE OF DISPLAYING SETTINGS HISTORY BUTTON, METHOD OF CONTROLLING SAME, AND STORAGE MEDIUM

(71) Applicant: CANON KABUSHIKI KAISHA, Tokyo (JP)

(72) Inventors: Ikuko Shino, Matsudo (JP); Yohei Shogaki, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/360,320

(22) Filed: Mar. 21, 2019

(65) Prior Publication Data
US 2019/0306349 A1 Oct. 3, 2019

(30) Foreign Application Priority Data
Mar. 27, 2018 (JP) .............................. JP2018-060343
Jan. 31, 2019 (JP) .............................. JP2019-015847

(51) Int. Cl.
*H04N 1/00* (2006.01)
(52) U.S. Cl.
CPC ..... *H04N 1/00517* (2013.01); *H04N 1/00482* (2013.01); *H04N 1/00514* (2013.01); *H04N 2201/0094* (2013.01)
(58) Field of Classification Search
None
See application file for complete search history.

(56) References Cited

U.S. PATENT DOCUMENTS

| | | | |
|---|---|---|---|
| 2009/0195819 A1* | 8/2009 | Sugimoto | H04N 1/00413 358/1.15 |
| 2015/0261481 A1* | 9/2015 | Takenaka | G06F 3/1285 358/1.15 |
| 2015/0277826 A1* | 10/2015 | Yanagawa | G06F 3/1253 358/1.15 |
| 2017/0094121 A1* | 3/2017 | Mizuno | G06F 21/45 |
| 2017/0346969 A1* | 11/2017 | Kaigawa | H04N 1/00503 |
| 2018/0373481 A1* | 12/2018 | Kobayashi | G06F 3/1285 |

FOREIGN PATENT DOCUMENTS

| | | |
|---|---|---|
| JP | H1020720 A | 1/1998 |
| JP | 2014236428 A | 12/2014 |

* cited by examiner

*Primary Examiner* — Thomas D Lee
(74) *Attorney, Agent, or Firm* — Rossi, Kimms & McDowell LLP

(57) ABSTRACT

An information processing apparatus that enables a user to easily grasp setting values associated with a settings history button. Execution of a function selected by a user is controlled using setting values set on a setting screen displayed with initial values of the setting values registered at factory shipment. An identification reference used for identifying a setting value used and different from a corresponding initial value is switched. An instruction for changing the initial values on the setting screen to other initial values than the initial values registered at factory shipment is received. Setting value information indicative of the identified setting value is displayed for a settings history button for calling setting values used for the function. If the initial values on the setting screen are changed to the other initial values, the identification reference is switched to the other initial values.

20 Claims, 25 Drawing Sheets

| TYPE | SETTINGS | | | | | | | |
|---|---|---|---|---|---|---|---|---|
| | NUMBER OF COPIES | COLOR SELECTION | MAGNIFICATION | SHEET SELECTION | PAGE AGGREGATION | DOUBLE-SIDED | FINISHING | DENSITY |
| APPARATUS DEFAULT SETTINGS | 1 | COLOR | 100% | AUTO | NULL | SINGLE-SIDED | NULL | ±0 |
| USER DEFAULT SETTINGS | 2 | MONOCHROME | 100% | AUTO | 2 in 1 | DOUBLE-SIDED | STAPLING (UPPER LEFT) | ±0 |
| STORED JOB SETTINGS DATA | 2 | COLOR | 100% | AUTO | NULL | DOUBLE-SIDED | STAPLING (UPPER LEFT) | +2 |

FIG. 9B

| TYPE | SETTINGS | | | | | | | |
|---|---|---|---|---|---|---|---|---|
| | NUMBER OF COPIES | COLOR SELECTION | MAGNIFICATION | SHEET SELECTION | PAGE AGGREGATION | DOUBLE-SIDED | FINISHING | DENSITY |
| APPARATUS DEFAULT SETTINGS | 1 | COLOR | 100% | AUTO | NULL | SINGLE-SIDED | NULL | ±0 |
| USER DEFAULT SETTINGS | | | | | | | | |
| STORED JOB SETTINGS DATA | 2 | COLOR | 100% | AUTO | NULL | DOUBLE-SIDED | STAPLING (UPPER LEFT) | +2 |

FIG. 9C

| TYPE | SETTINGS | | | | | | | |
|---|---|---|---|---|---|---|---|---|
| | NUMBER OF COPIES | COLOR SELECTION | MAGNIFICATION | SHEET SELECTION | PAGE AGGREGATION | DOUBLE-SIDED | FINISHING | DENSITY |
| APPARATUS DEFAULT SETTINGS | 1 | COLOR | 100% | AUTO | NULL | SINGLE-SIDED | NULL | ±0 |
| USER DEFAULT SETTINGS | 2 | MONOCHROME | 100% | AUTO | 2 in 1 | DOUBLE-SIDED | STAPLING (UPPER LEFT) | ±0 |
| STORED JOB SETTINGS DATA | 5 | COLOR | 100% | AUTO | 2 in 1 | DOUBLE-SIDED | STAPLING (UPPER LEFT) | ±0 |

| TYPE | SETTINGS | | | | | | | |
|---|---|---|---|---|---|---|---|---|
| | DESTINATION | NUMBER OF DESTINATIONS | DOUBLE-SIDED ORIGINAL | READING SIZE | ORIGINAL SIZES MIXED | FILE FORMAT | COLOR SELECTION | RESOLUTION |
| APPARATUS DEFAULT SETTINGS | – | – | – | – | – | PDF | AUTO (COLOR/MONO) | 600dpi |
| USER DEFAULT SETTINGS | shino@xxx.co.jp | 1 | – | – | – | PDF | AUTO (COLOR/MONO) | 600dpi |
| STORED JOB SETTINGS DATA | inoue@xxx.co.jp | 1 | – | A4 | – | PDF | AUTO (COLOR/MONO) | 200dpi |

FIG. 9E

| TYPE | SETTINGS | | | | | | | |
|---|---|---|---|---|---|---|---|---|
| | NUMBER OF COPIES | COLOR SELECTION | MAGNIFICATION | SHEET SELECTION | PAGE AGGREGATION | DOUBLE-SIDED | FINISHING | DENSITY |
| APPARATUS DEFAULT SETTINGS | 1 | COLOR | 100% | AUTO | NULL | SINGLE-SIDED | NULL | ±0 |
| USER DEFAULT SETTINGS | 2 | COLOR | 100% | AUTO | NULL | DOUBLE-SIDED | PUNCHING | ±0 |
| STORED JOB SETTINGS DATA | 2 | COLOR | 100% | AUTO | NULL | DOUBLE-SIDED | STAPLING (UPPER LEFT) | +2 |

| TYPE | SETTINGS | | | | | | | |
|---|---|---|---|---|---|---|---|---|
| | NUMBER OF COPIES | COLOR SELECTION | MAGNIFICATION | SHEET SELECTION | PAGE AGGREGATION | DOUBLE-SIDED | FINISHING | DENSITY |
| APPARATUS DEFAULT SETTINGS | 1 | COLOR | 100% | AUTO | NULL | SINGLE-SIDED | NULL | ±0 |
| STORED JOB SETTINGS DATA | 5 | COLOR | 100% | AUTO | NULL | SINGLE-SIDED | STAPLING (UPPER LEFT) | +2 |

FIG. 11A

| BUTTON ID | APPLICATION ID | APPLICATION NAME | DATA | DISPLAYED TEXT/ICON ||| 
|---|---|---|---|---|---|---|
| 1100 | 1101 | 1102 | 1103 | 1104 | | |
| | | | | DATE AND TIME | SETTING VALUE TEXT | SETTING VALUE ICON |
| | | | | 1105 | 1106 | 1107 |
| | | | | | | |
| | | | | | | |

| BUTTON ID | APPLICATION ID | APPLICATION NAME | DATA | DATE AND TIME | SETTING VALUE TEXT | SETTING VALUE ICON |
|---|---|---|---|---|---|---|
| 1001 | 101 | COPY | data1.xml | 2016/12/15 13:01:22 | 2 COPIES, 100% | AUTO SHEET SELECTION |

| BUTTON ID | APPLICATION ID | APPLICATION NAME | DATA | DATE AND TIME | SETTING VALUE TEXT | SETTING VALUE ICON |
|---|---|---|---|---|---|---|
| 1001 | 101 | COPY | data1.xml | 2016/12/15 13:01:22 | 2 COPIES, 100% | AUTO SHEET SELECTION |
| 1002 | 101 | COPY | data2.xml | 2016/12/16 15:38:16 | 5 COPIES, 100% | AUTO SHEET SELECTION |

| BUTTON ID | APPLICATION ID | APPLICATION NAME | DATA | DATE AND TIME | SETTING VALUE TEXT | SETTING VALUE ICON |
|---|---|---|---|---|---|---|
| 1001 | 101 | COPY | data1.xml | 2016/12/18 12:54:30 | 2 COPIES, 100% | AUTO SHEET SELECTION |
| 1002 | 101 | COPY | data2.xml | 2016/12/16 15:38:16 | 5 COPIES, 100% | AUTO SHEET SELECTION |

FIG. 11E

| BUTTON ID | APPLICATION ID | APPLICATION NAME | DATA | DATE AND TIME | SETTING VALUE TEXT | SETTING VALUE ICON |
|---|---|---|---|---|---|---|
| 1001 | 101 | COPY | data1.xml | 2016/12/15 13:01:22 | 2 COPIES, 100% | AUTO SHEET SELECTION |
| 1002 | 101 | COPY | data2.xml | 2016/12/16 15:38:16 | 5 COPIES, 100% | AUTO SHEET SELECTION |
| 1003 | 201 | SCAN & TRANSMISSION | data1.xml | 2016/12/17 08:25:43 | inoue@xxxx.co.jp, 1 ITEM, | PDF A4 200x200dpi |

| BUTTON ID | APPLICATION ID | APPLICATION NAME | DATA | DATE AND TIME | SETTING VALUE TEXT | SETTING VALUE ICON |
|---|---|---|---|---|---|---|
| 1001 | 101 | COPY | data1.xml | 2016/12/15 13:01:22 | 2 COPIES, 100% | AUTO SHEET SELECTION |

FIG. 13

| APPLICATION ID | ALWAYS DISPLAYED SETTING | | | | | | |
|---|---|---|---|---|---|---|---|
| | DATE & TIME | APPLICATION ICON | APPLICATION NAME | NUMBER OF COPIES | COLOR SELECTION | MAGNIFICATION | SHEET SELECTION |
| 101 | DATE & TIME | APPLICATION ICON | APPLICATION NAME | NUMBER OF DESTINATIONS FOR MULTI TRANSMISSION | PROTOCOL | FIRST DESTINATION | |
| 201 | DATE & TIME | APPLICATION ICON | APPLICATION NAME | NUMBER OF DESTINATIONS FOR MULTI TRANSMISSION | PROTOCOL | FIRST DESTINATION | |
| 301 | DATE & TIME | APPLICATION ICON | APPLICATION NAME | ⋮ | ⋮ | ⋮ | ⋮ |
| etc... | DATE & TIME | | | | | | |
| ⋮ | DATE & TIME | | | | | | |
| ⋮ | DATE & TIME | | | | | | |

| APPLICATION NAME | APPLICATION ICON | |
|---|---|---|
| COPY | 🗇 | |
| SETTING NAME | DETAILS OF SETTING | ICON |
| COLOR SELECTION | AUTO COLOR SELECTION | [icon] |
| | FULL COLOR | [icon] |
| | AUTO (BINARY) | [icon] |
| | ... | |
| SHEET SELECTION | AUTO SHEET SELECTION | AUTO SHEET SELECTION |
| | FIRST FEEDER | [1] |
| | SECOND FEEDER | [2] |
| | ... | ... |
| | MANUAL FEEDING | [icon] |
| PAGE AGGREGATION | PAGE AGGREGATION NOT SET | [icon] |
| | 2 in 1 | [icon] |
| | 4 in 1 | [icon] |
| | ... | ... |
| DOUBLE-SIDED | SINGLE-SIDED → SINGLE-SIDED | [icon] |
| | SINGLE-SIDED → DOUBLE-SIDED | [icon] |
| | DOUBLE-SIDED → SINGLE-SIDED | [icon] |
| | DOUBLE-SIDED → DOUBLE-SIDED | [icon] |
| FINISHING | STAPLING NOT SET | [icon] ~1401 |
| | STAPLING AT UPPER LEFT | [icon] |
| | STAPLING AT LOWER LEFT | [icon] |
| | ... | ... |
| | PUNCHING NOT SET | [icon] ~1402 |
| | PUNCHING | [icon] |
| ... | ... | ... |
| ... | ... | ... |
| DENSITY | ... | ... |
| | ±2 | [icon] |
| | ±1 | [icon] |
| | ±0 | [icon] |
| | ... | ... |

1400

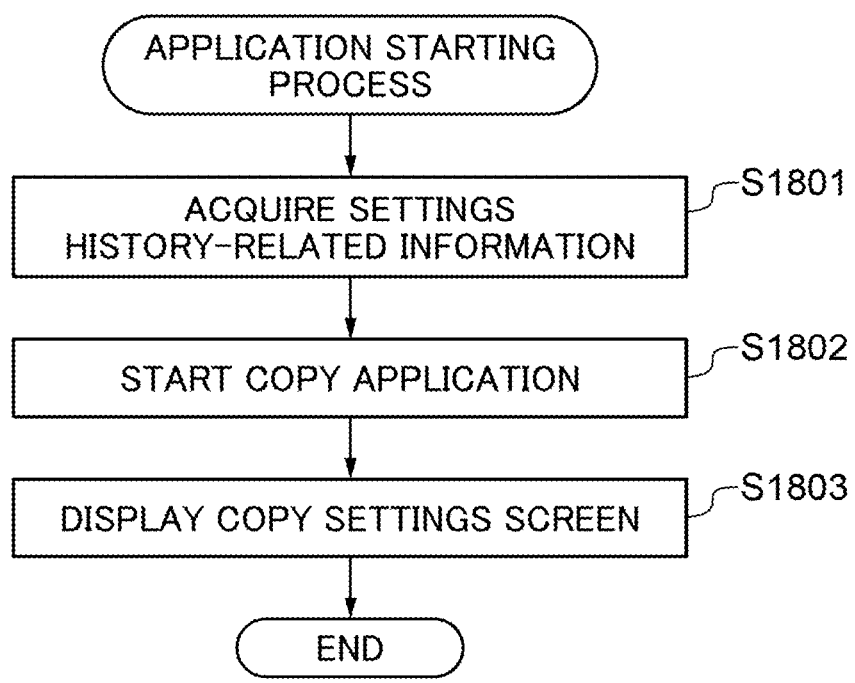

FIG. 19

| APPLICATION NAME | APPLICATION ICON | |
|---|---|---|
| COPY | 🗋 | |
| SETTING NAME | DETAILS OF SETTING | ICON |
| COLOR SELECTION | AUTO COLOR SELECTION | |
| | FULL COLOR | |
| | AUTO (BINARY) | |
| | ... | |
| SHEET SELECTION | AUTO SHEET SELECTION | AUTO SHEET SELECTION |
| | FIRST FEEDER | |
| | SECOND FEEDER | |
| | ... | ... |
| | MANUAL FEEDING | |
| PAGE AGGREGATION | PAGE AGGREGATION NOT SET | BLANK |
| | 2 in 1 | |
| | 4 in 1 | |
| | ... | ... |
| DOUBLE-SIDED | SINGLE-SIDED → SINGLE-SIDED | |
| | SINGLE-SIDED → DOUBLE-SIDED | |
| | DOUBLE-SIDED → SINGLE-SIDED | |
| | DOUBLE-SIDED → DOUBLE-SIDED | |
| FINISHING | STAPLING NOT SET | BLANK |
| | STAPLING AT UPPER LEFT | |
| | STAPLING AT LOWER LEFT | |
| | ... | ... |
| | PUNCHING NOT SET | BLANK |
| | PUNCHING | |
| ... | ... | ... |
| ... | ... | ... |
| DENSITY | ... | ... |
| | ±2 | |
| | ±1 | |
| | ±0 | |
| | ... | ... |

| APPLICATION NAME | APPLICATION ICON | |
|---|---|---|
| SCAN & TRANSMISSION | ✈ | |
| SETTING NAME | DETAILS OF SETTING | ICON |
| PROTOCOL | E-MAIL | 📧 |
| | FAX | 🖨 |
| | BOX | 📦 |
| | ... | ... |
| RESOLUTION | 200 × 200 | 200×200dpi |
| | 200 × 100 | 200×100dpi |
| | ... | ... |
| | 600 × 600 | 600×600dpi |
| | 150 × 150 | 150×150dpi |
| ... | ... | ... |
| ... | ... | ... |
| DOUBLE-SIDED ORIGINAL | SINGLE-SIDED ORIGINAL | ▯ |
| | DOUBLE-SIDED ORIGINAL, BOOK TYPE | |
| | DOUBLE-SIDED ORIGINAL, CALENDAR TYPE | |
| FILE FORMAT | TIFF/JPEG | TIFF/JPEG |
| | ... | |
| | PDF | PDF |
| ... | ... | ... |
| READING SIZE | AUTO | AUTO SIZE READING |
| | A4 | A4 |
| | A4R | A4R |
| | ... | ... |
| | LTR | LTR |
| | LTRR | LTRR |
| | ... | ... |

2000

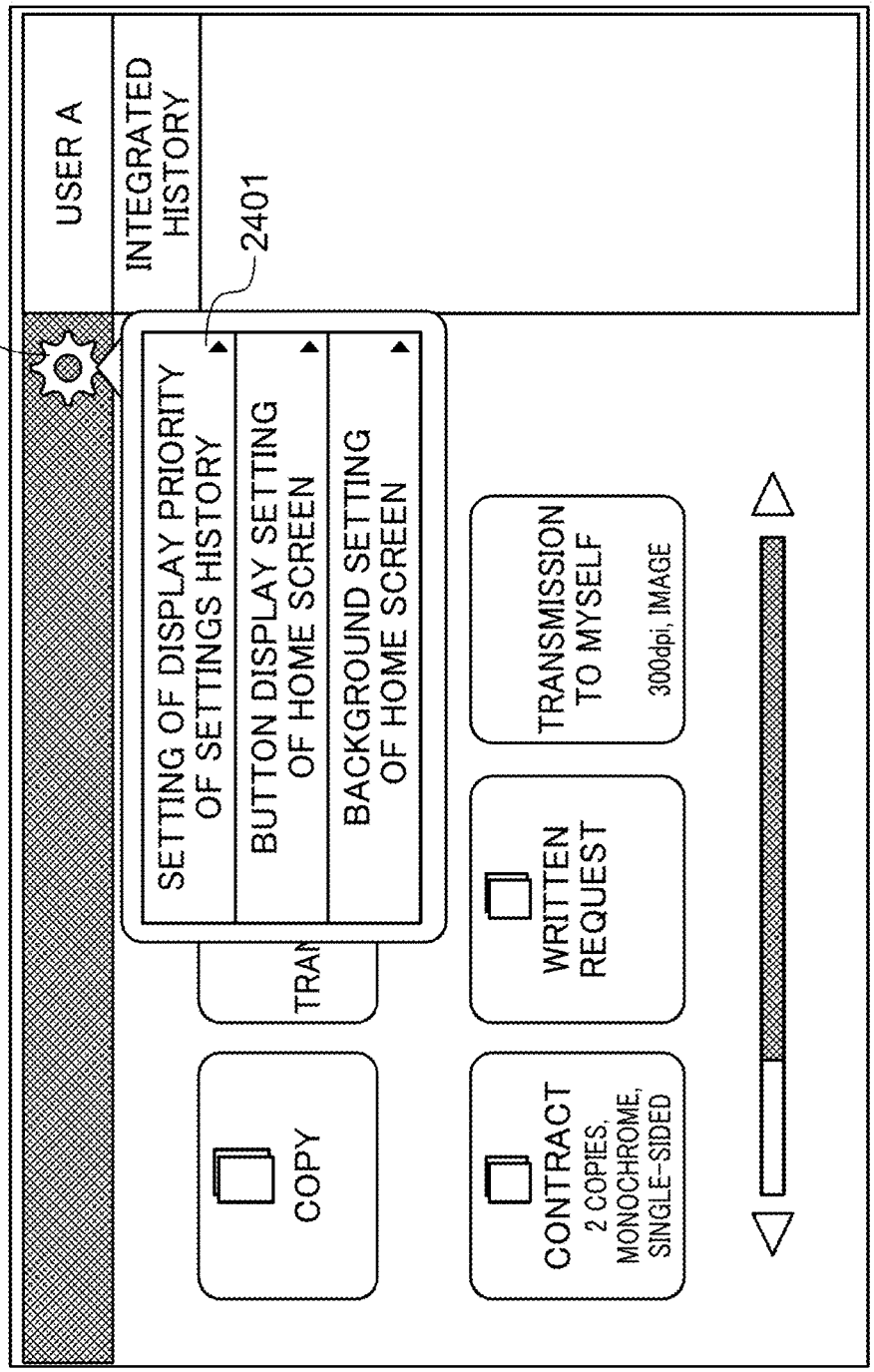

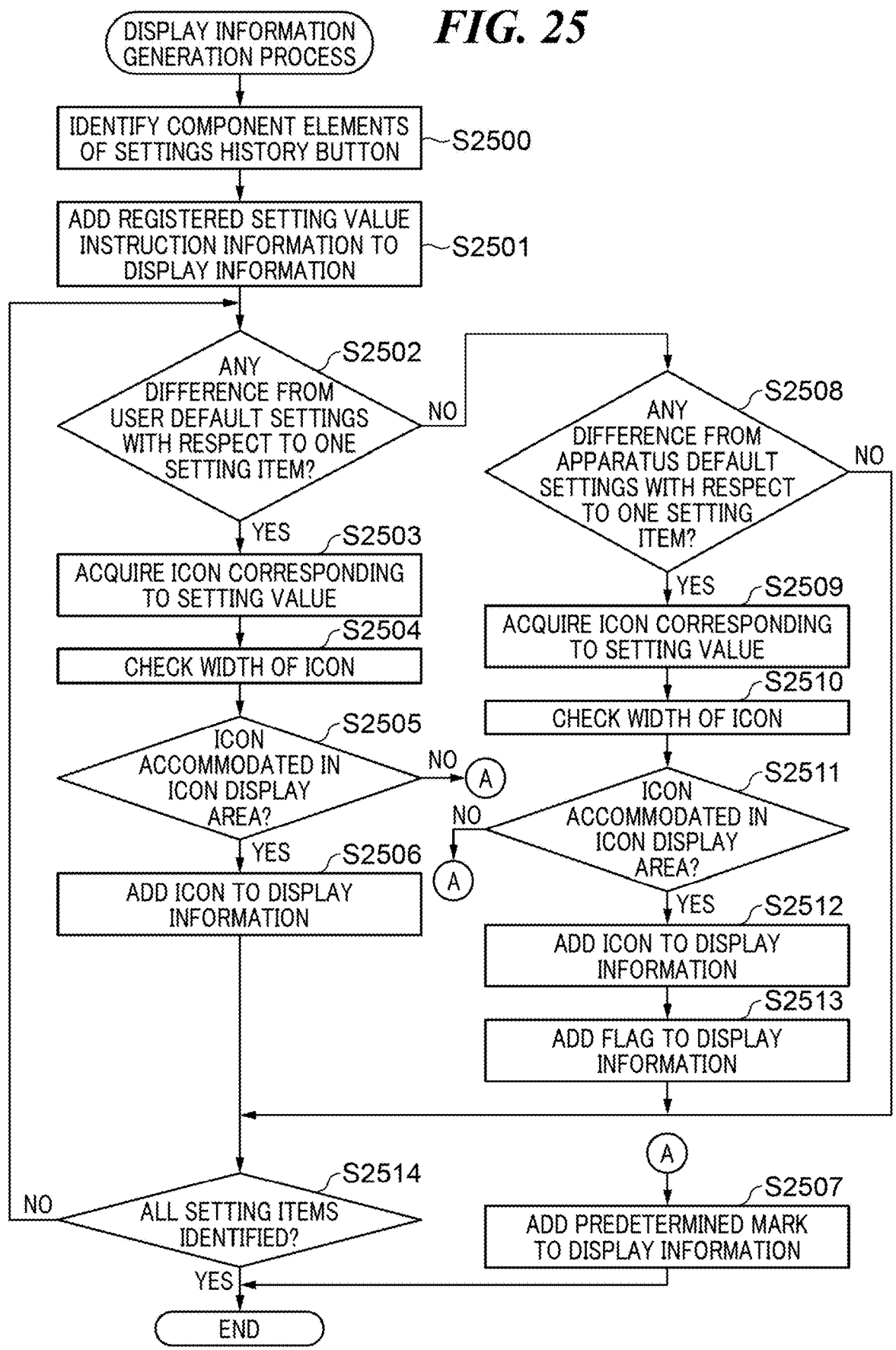

INFORMATION PROCESSING APPARATUS CAPABLE OF DISPLAYING SETTINGS HISTORY BUTTON, METHOD OF CONTROLLING SAME, AND STORAGE MEDIUM

BACKGROUND OF THE INVENTION

Field of the Invention

The present invention relates to an information processing apparatus that is capable of displaying a settings history button, a method of controlling the same, and a storage medium.

Description of the Related Art

There has been known an MFP as an information processing apparatus that executes a job using setting values set by a user on a setting screen. Initial values registered at factory shipment of the MFP are set for respective setting items on the setting screen (see e.g. Japanese Laid-Open Patent Publication (Kokai) No. H10-20720). The user instructs the MFP to execute a job by using the initial values as they are, or inputting other values different from the initial values.

Further, in the MFP, the user can also call setting values of a job executed in the past only by pressing a settings history button displayed on a display section of the MFP without entering a setting value for each setting item. Upon execution of a job, the MFP generates a settings history button associated with the setting values used for the job. On the settings history button, there is displayed a character string, for example, which is indicative of a setting value, intentionally input by the user, of the setting values used for the job (see e.g. Japanese Laid-Open Patent Publication (Kokai) No. 2014-236428). More specifically, the MFP identifies, with reference to the initial values of the setting items on the setting screen, any of the setting values used for the job, which is/are different from the initial values thereof, and displays a character string indicative of the identified setting values on the settings history button. The user can recollect setting contents of the job, from the character string displayed on the settings history button, to thereby grasp the setting values associated with the settings history button.

Incidentally, in recent years, there has been developed an MFP that is capable of changing the initial values of the setting items on the setting screen to other initial values different from the initial values registered at factory shipment. In a case where a job is executed by the MFP of this type, not the changed initial values, but the initial values registered at factory shipment are directly used as the reference for identifying setting values which are different from the initial values. Therefore, information on the setting values intentionally input by the user on the setting screen is sometimes not accurately reflected on the settings history button for calling the setting values used for the job. If the information on the contents input by the user is thus not accurately reflected on the settings history button, the user cannot recollect the setting contents of the job from the information appearing on the settings history button to thereby grasp the setting values associated with the settings history button.

SUMMARY OF THE INVENTION

The present invention provides an information processing apparatus that enables a user to easily grasp setting values associated with a settings history button, a method of controlling the same, and a storage medium.

In a first aspect of the present invention, there is provided an information processing apparatus that displays a setting screen for setting a plurality of setting values used for a function selected by a user, in a state in which initial values registered at factory shipment are set thereon, comprising a control unit configured to control execution of the function which uses the plurality of setting values set on the setting screen, a display control unit configured to control display of a settings history button for calling the plurality of setting values used for the function according to execution of the function, a reference switching unit configured to switch an identification reference for use in identifying, from the plurality of setting values used for the function, a setting value which is different from an initial value thereof on the setting screen, a generation unit configured to generate setting value information indicative of the setting value identified based on the identification reference, and a change instruction-receiving unit configured to receive an instruction for changing the initial values on the setting screen to other initial values than the initial values registered at factory shipment, wherein the display control unit displays the setting value information for the settings history button, and wherein in a case where the initial values on the setting screen are changed to the other initial values, the reference switching unit switches the identification reference to the other initial values.

In a second aspect of the present invention, there is provided a method of controlling an information processing apparatus that displays a setting screen for setting a plurality of setting values used for a function selected by a user, in a state in which initial values registered at factory shipment are set thereon, comprising controlling execution of the function which uses the plurality of setting values set on the setting screen, controlling display of a settings history button for calling the plurality of setting values used for the function according to execution of the function, switching an identification reference for use in identifying, from the plurality of setting values used for the function, a setting value which is different from an initial value thereof on the setting screen, generating setting value information indicative of the setting value identified based on the identification reference, and receiving an instruction for changing the initial values on the setting screen to other initial values than the initial values registered at factory shipment, displaying the setting value information for the settings history button, and switching, in a case where the initial values on the setting screen are changed to the other initial values, the identification reference to the other initial values.

In a third aspect of the present invention, there is provided a non-transitory computer-readable storage medium storing a computer-executable program for executing a method of controlling an information processing apparatus that displays a setting screen for setting a plurality of setting values used for a function selected by a user, in a state in which initial values registered at factory shipment are set thereon, wherein the method comprises controlling execution of the function which uses the plurality of setting values set on the setting screen, controlling display of a settings history button for calling the plurality of setting values used for the function according to execution of the function, switching an identification reference for use in identifying, from the plurality of setting values used for the function, a setting value which is different from an initial value thereof on the setting screen, generating setting value information indicative of the setting value identified based on the identification reference, and receiving an instruction for changing the initial values on the setting screen to other initial values than the initial values registered at factory shipment, displaying the setting value information for the settings history button, and switching, in a case where the initial values on the setting screen are changed to the other initial values, the identification reference to the other initial values.

According to the present invention, the user is enabled to easily grasp setting values associated with the settings history button.

Further features of the present invention will become apparent from the following description of exemplary embodiments (with reference to the attached drawings).

BRIEF DESCRIPTION OF THE DRAWINGS

FIGS. 9A to 9F are diagrams each showing an example of a copy settings management table managed by the MFP shown in FIG. 1.

FIGS. 11A to 11F are diagrams each showing an example of an integrated history management table managed by the MFP shown in FIG. 1.

FIG. 13 is a diagram showing an example of a component element management table managed by the MFP shown in FIG. 1.

FIG. 14 is a diagram showing an example of an icon association table associated with a copy job, which is managed by the MFP shown in FIG. 1.

FIG. 18 is a flowchart of an application starting process performed by the MFP shown in FIG. 1.

FIG. 19 is a diagram showing an example of the icon association table associated with a copy job, which is managed by the MFP shown in FIG. 1.

FIG. 20 is a diagram showing an example of an icon association table associated with a transmission job, which is managed by the MFP shown in FIG. 1.

FIG. 24 is a view useful in explaining a display priority-setting button displayed on the touch panel appearing in FIG. 2.

FIG. 25 is a flowchart of a variation of the display information generation process performed in the step in FIG. 10.

DESCRIPTION OF THE EMBODIMENTS

The present invention will now be described in detail below with reference to the accompanying drawings showing embodiments thereof.

Figure 1:
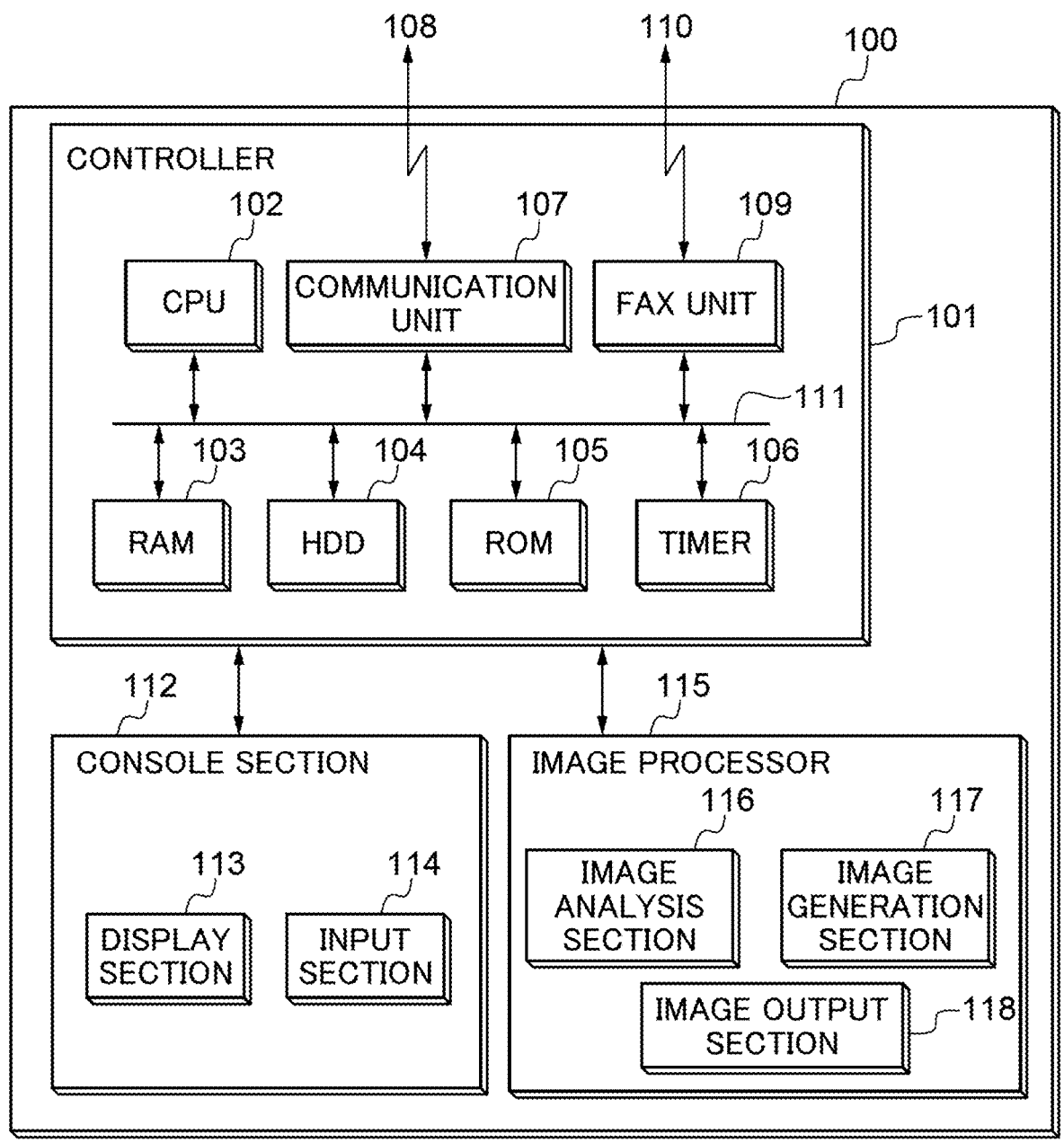
FIG. 1 is a schematic block diagram of an MFP as an information processing apparatus according to an embodiment of the present invention.

FIG. 1 is a schematic block diagram of an MFP 100 as an information processing apparatus according to an embodiment of the present invention. Referring to FIG. 1, the MFP 100 includes a controller 101, a console section 112, and an image processor 115. The controller 101 is connected to the console section 112 and the image processor 115.

A plurality of applications for realizing functions, such as a copy function, a scan function, and a transmission function, have been installed in the MFP 100 in advance. The controller 101 includes a CPU 102, a RAM 103, an HDD 104, a ROM 105, a timer 106, a communication unit 107, and a FAX unit 109. The CPU 102, the communication unit 107, the RAM 103, the HDD 104, the ROM 105, the timer 106, and the FAX unit 109 are interconnected via a system bus 111.

The controller 101 performs centralized control of the MFP 100. The CPU 102 controls the overall operation of the controller 101. For example, the CPU 102 executes a boot program stored in the ROM 105, loads programs of the above-mentioned applications from the HDD 104 into the RAM 103, and performs various control based on the loaded programs. The RAM 103 provides a system work memory for the operation of the CPU 102. The HDD 104 is a hard disk drive. The HDD 104 stores the programs of the applications, and data used for the applications. Further, the HDD 104 stores document data, setting data, etc. Note that in the present embodiment, an external server, a PC, or the like, which can communicate with the MFP 100 via the communication unit 107 may be used in place of the HDD 104 without incorporating the HDD 104 in the MFP 100. The ROM 105 is a boot ROM, and stores the boot program of the system of the MFP 100. The timer 106 counts time according to an instruction from the CPU 102. When a time period set by the instruction elapses, the timer 106 notifies the CPU 102 of this fact by interrupt. The communication unit 107 transmits and receives data to and from an external apparatus (not shown) via a LAN 108. The FAX unit 109 transmits and receives facsimile data to and from an external apparatus via a telephone line 110.

The console section 112 is a user interface of the MFP 100. The console section 112 includes a display section 113 and an input section 114. The display section 113 displays various information of the MFP 100 to a user. The input section 114 is composed e.g. of a touch panel, a mouse, a camera, an audio input, and a keyboard, and receives an instruction input by the user. The image processor 115 performs image processing. Further, the image processor 115 includes an image analysis section 116, an image generation section 117, and an image output section 118. The image analysis section 116 analyzes the structure of an image of an original, and extracts necessary information from the analysis result. The image generation section 117 digitizes an image of a read original to generate image data. The generated image data is stored in the HDD 104. Further, the image generation section 117 can convert the image data to image data of another format using the information analyzed by the image analysis section 116. The image output section 118 performs processing for outputting the image data stored in the HDD 104. The processing for outputting the image data includes, for example, processing for printing the image data on a sheet, processing for transmitting the image data to an external apparatus via the communication unit 107, and processing for storing the image data in a storage medium connected to the MFP 100.

Figure 2:
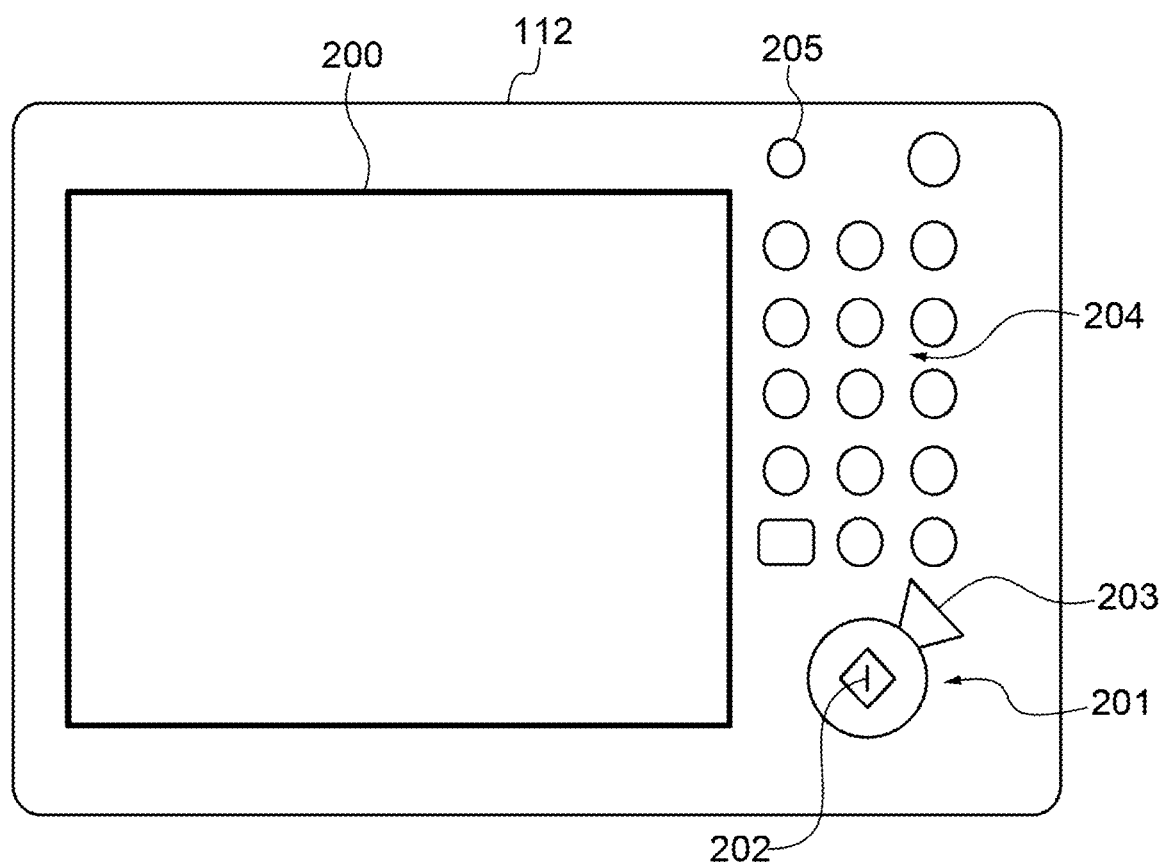
FIG. 2 is a view of the appearance of a console section appearing in FIG. 1.

FIG. 2 is a view of the appearance of the console section 112 appearing in FIG. 1. Referring to FIG. 2, the console section 112 includes the touch panel, denoted by reference numeral 200, a start key 201, LEDs 202, a stop key 203, a numeric keypad 204, and a user mode key 205.

The touch panel 200 is a liquid crystal display section, and has a liquid crystal surface covered by a touch panel sheet. The touch panel 200 displays an operation screen and software keys, and when a displayed software key is pressed by the user, the touch panel 200 sends position information indicative of the pressed position to the CPU 102. The touch panel 200, in this case, functions as the display section 113 appearing in FIG. 1, and further functions as the input section 114. The start key 201 is used, for example, when the user instructs the MFP 100 to start an operation for reading an original. The central part of the start key 201 is formed by the LEDs 202 of two colors, green and red, and whether or not the start key 201 can be used is indicated by the lighted color of the LEDs 202. The stop key 203 is used, for example, when the user instructs the MFP 100 to stop an operation being executed. The numeric keypad 204 is composed of buttons of numbers and characters, and are used, for example, for the user to set the number of copies for printing and instruct the MFP 100 to change a screen on the touch panel 200. The user mode key 205 is used when the user sets the settings of the MFP 100. In the following description, an operation of the CPU 102 for calling screen display data and a screen control program from the HDD 104 or the RAM 103 and displaying the screen display data on the display section 113 is described as "the CPU 102 displays a screen".

Figure 3:
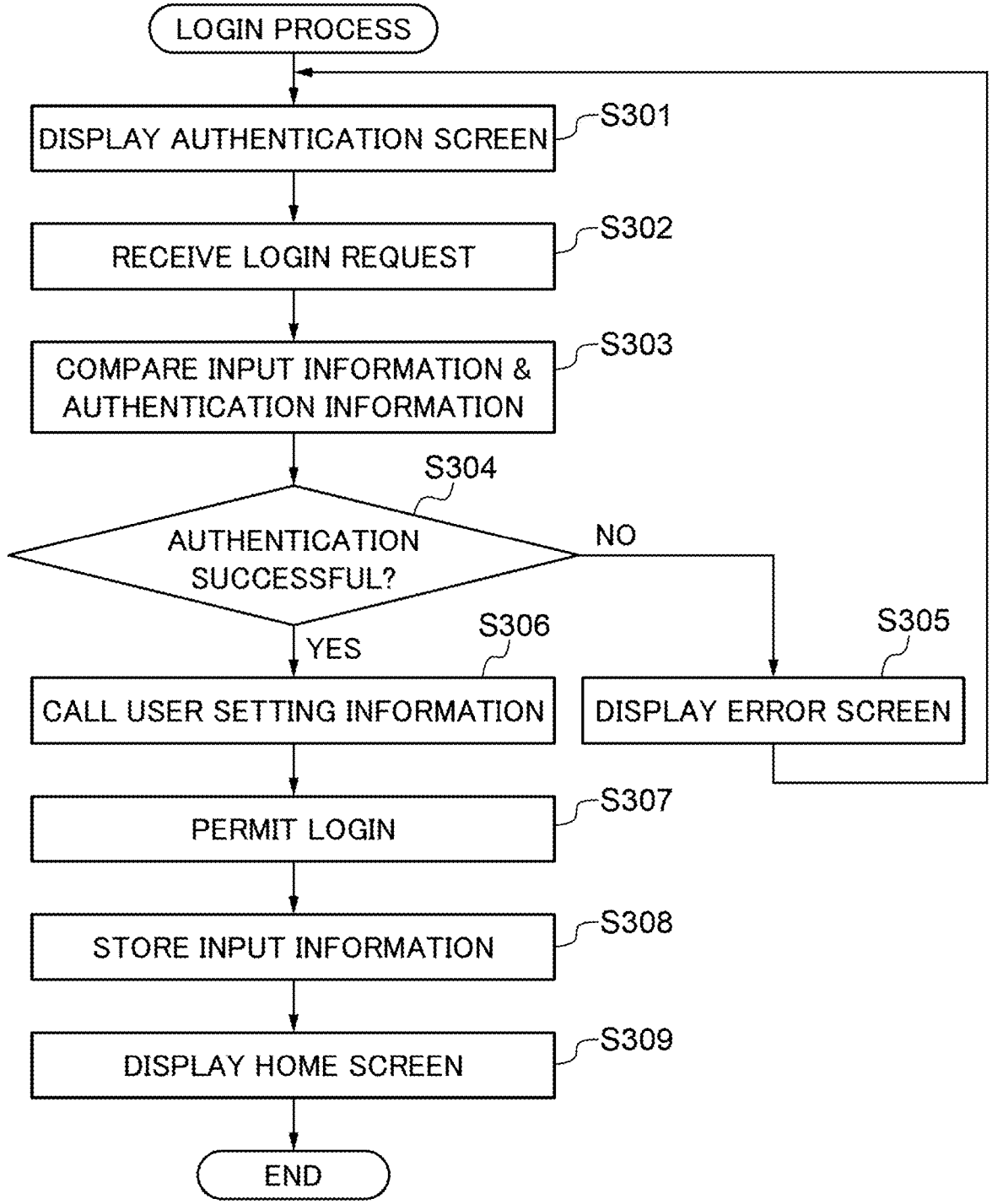
FIG. 3 is a flowchart of a login process performed by the MFP shown in FIG. 1.

FIG. 3 is a flowchart of a login process performed by the MFP 100 shown in FIG. 1. The process in FIG. 3 is performed by the CPU 102 that executes an associated program stored in the HDD 104 or the ROM 105. The process in FIG. 3 is performed, for example, when the MFP 100 is started. Note that in the process in FIG. 3, it is assumed that authentication information used for user authentication has been registered in advance. The authentication information refers to the user name indicative of a user who is permitted to use the MFP 100 and a password associated with the user.

Figure 4:
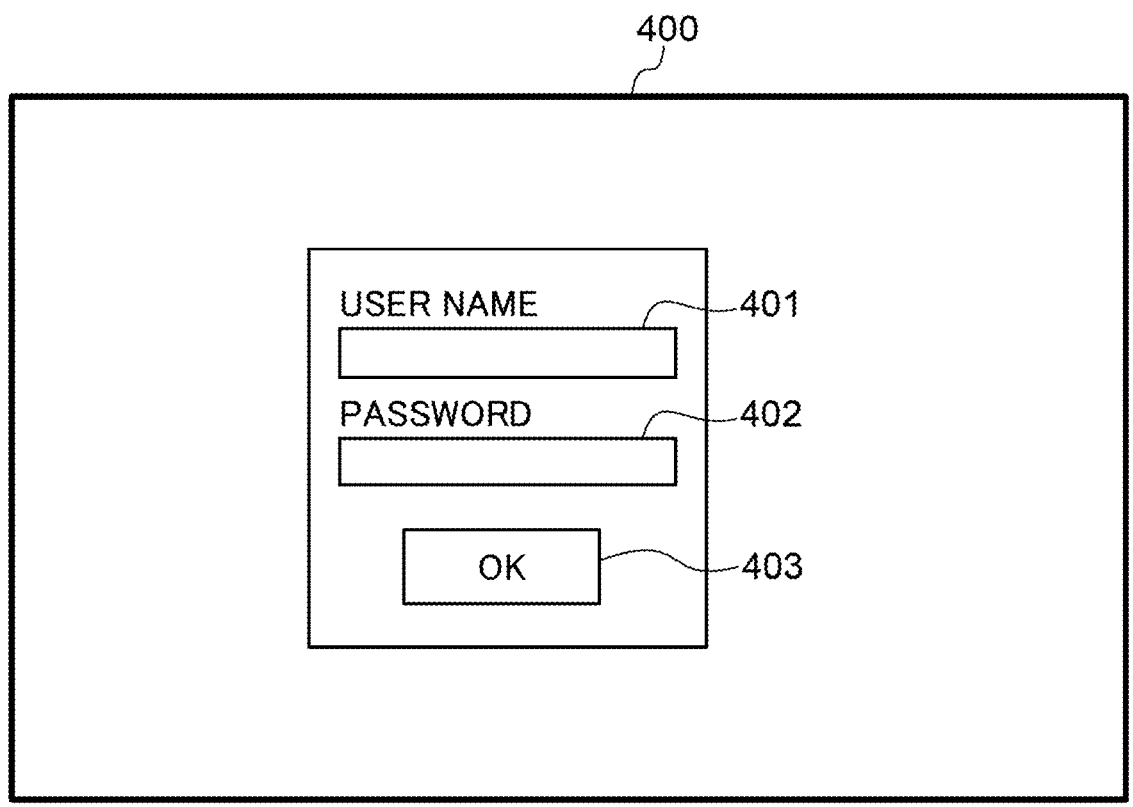
FIG. 4 is a view showing an example of an authentication screen displayed on a touch panel appearing in FIG. 2.

Referring to FIG. 3, first, if the user authentication setting is set to on, the CPU 102 displays an authentication screen 400 shown in FIG. 4 on the touch panel 200 (step S301). The authentication screen 400 includes input fields 401 and 402, and an OK button 403. The user inputs the user name indicative of the user in the input field 401, inputs the password in the input field 402, and further, presses the OK button 403 to send a login request to the MFP 100. Upon receipt of the login request from the user (step S302), the CPU 102 compares the information input on the authentication screen 400 with the authentication information registered in advance (step S303). Then, the CPU 102 determines whether or not the authentication is successful based on a result of the comparison (step S304). In the step S304, for example, in a case where the authentication information which coincides with the input information has been registered, the CPU 102 determines that the authentication is successful. On the other hand, in a case where the authentication information which coincides with the input information has not been registered, the CPU 102 determines that the authentication has failed.

If it is determined in the step S304 that the authentication has failed, the CPU 102 displays an error screen on the touch panel 200 (step S305), and returns to the step S301.

If it is determined in the step S304 that the authentication is successful, the CPU 102 calls user setting information associated with the authentication information (step S306). The user setting information is information which can be used only by the user indicated by the associated authentication information and has been registered by the user in advance. The user setting information includes information on the layout of the setting screen displayed on the touch panel 200, information on initial values of the setting items of the setting screen, etc. Then, the CPU 102 permits the user having sent the login request to log in the MFP 100 (step S307). Then, the CPU 102 stores the input information input by the user having logged in the MFP 100 (hereinafter referred to as the "logged-in user") in the HDD 104 (step S308). Then, the CPU 102 displays a home screen 500, shown in FIG. 5, on which the called user setting information is reflected on the touch panel 200 (step S309), followed by terminating the present process.

Figure 5:
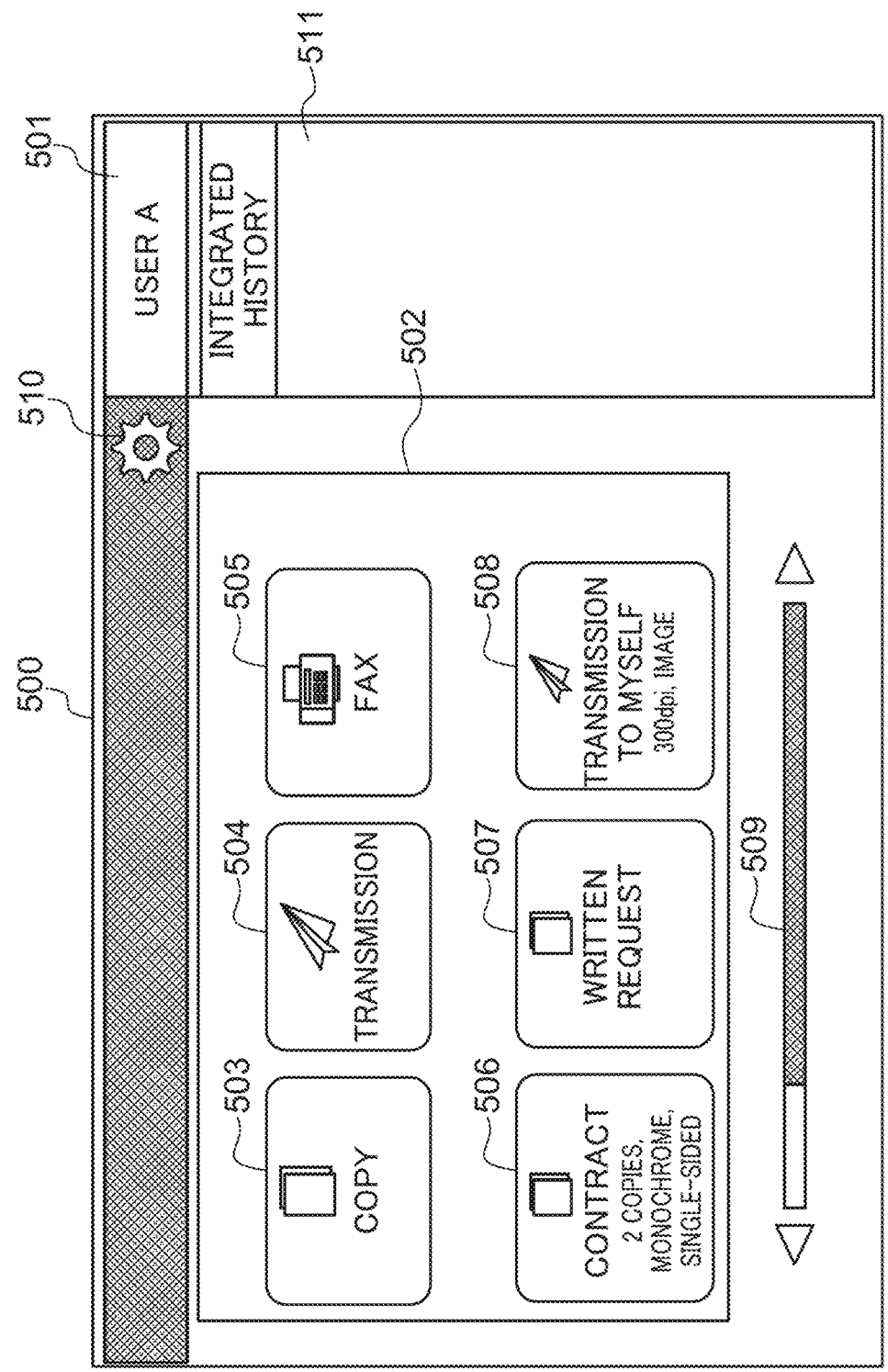
FIG. 5 is a view showing an example of a home screen displayed on the touch panel appearing in FIG. 2.

FIG. 5 is a view showing an example of the home screen 500 displayed on the touch panel 200 appearing in FIG. 2. The home screen 500 is formed by an area 501, a menu 502, and an integrated history 511. A character string indicative of a logged-in user is displayed in the area 501. Application buttons 503 to 505 and custom buttons 506 to 508 are displayed on the menu 502. The order of arranging these buttons is determined based on the above-mentioned user setting information. The menu 502 is formed by one or more pages of screens. The number of buttons displayed on one page is defined in advance.

Each of the application buttons 503 to 505 is a button for starting an associated application. When one of the application buttons 503 to 505 is pressed on the home screen 500, a setting screen associated with the pressed button is displayed on the touch panel 200. The setting screen is displayed in a state in which initial values included in the default settings registered in advance are set for the respective setting items. For example, on the above-mentioned setting screen, initial values included in apparatus default settings registered at factory shipment are set for the respective setting items. The apparatus default settings include initial values shared by all users who use the MFP 100. In the MFP 100, the registered contents of the apparatus default settings cannot be edited. Further, in the MFP 100, each user who can log in the MFP 100 can register user-specific default settings (hereinafter referred to as the "user default settings"). The user default settings include initial values specific to the user who uses the MFP 100. That is, in the present embodiment, the initial values are set for the respective setting items of the setting screen, based on the default settings, which are set by selecting from between the apparatus default settings and the user default settings.

Each of the custom buttons 506 to 508 is a button for starting an associated application using setting values registered in advance. The custom buttons 506 to 508 are classified into user's own buttons which are displayed on the home screen 500 when the user having registered the setting values logs in the MFP 100, and shared buttons which are displayed on the home screen 500 even when a user other than the user having registered the setting values logs in the MFP 100. A slide bar 509 is used for changing a page of the menu 502. A setting button 510 is a button for displaying setting items related to the home screen 500. In the integrated history 511, settings history buttons for calling respective settings history records of jobs executed by the MFP 100 based on instructions from a logged-in user are displayed. In a case where the MFP 100 has never executed a job or in a case where the settings history records of all executed jobs have been deleted, no settings history buttons are displayed in the integrated history 511 as in FIG. 5.

Figure 6:
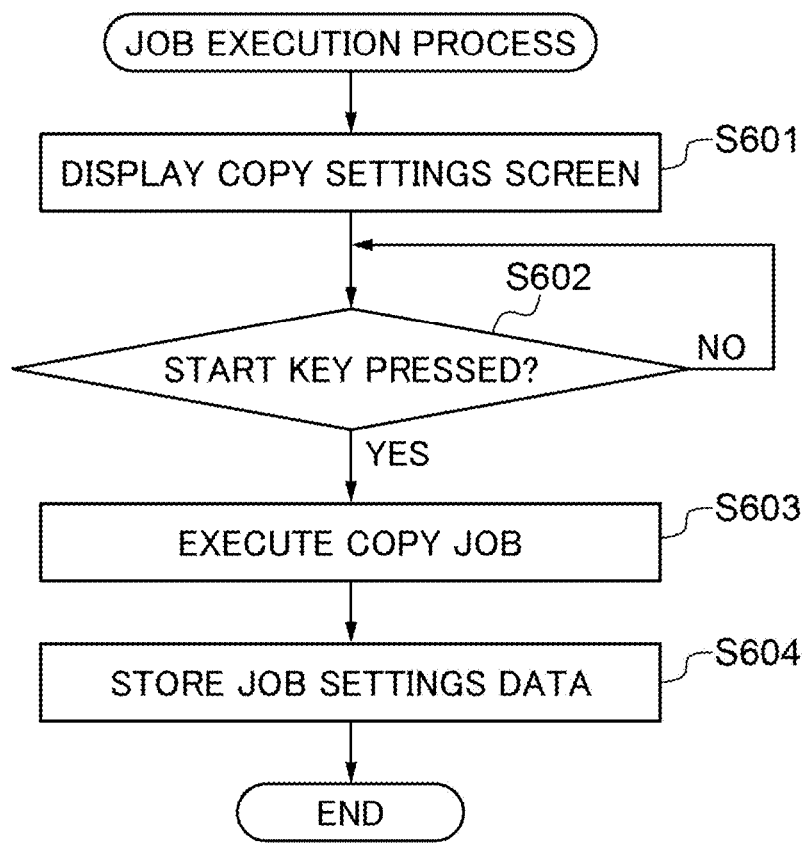
FIG. 6 is a flowchart of a job execution process performed by the MFP shown in FIG. 1.

FIG. 6 is a flowchart of a job execution process performed by the MFP 100 shown in FIG. 1. The process in FIG. 6 is also performed by the CPU 102 that executes an associated program stored in the HDD 104 or the ROM 105. The process in FIG. 6 is performed when any of the application buttons 503 to 505 and the custom buttons 506 to 508 is pressed by the user. In FIG. 6, the description is given of the process performed when the application button 503 for starting a copy application (not shown) which realizes the copy function is pressed by the user, by way of example.

Figure 7A:
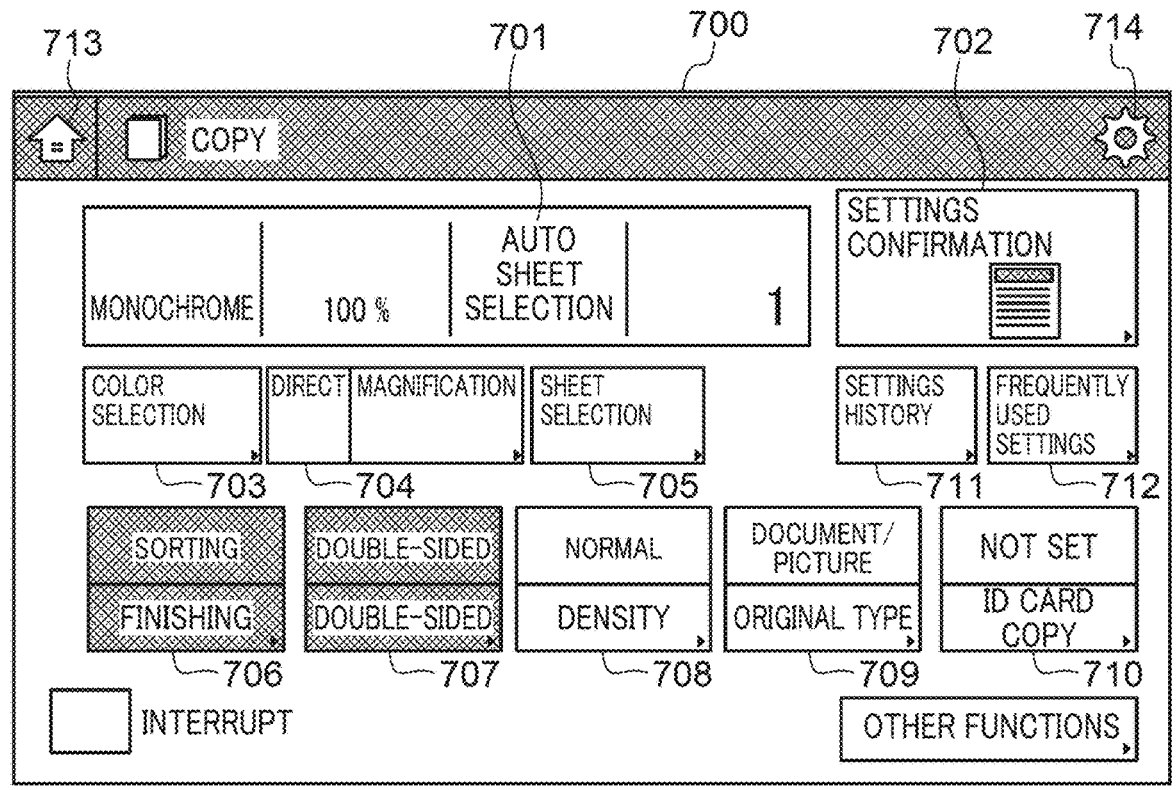
FIGS. 7A and 7B are views each showing an example of a copy setting screen displayed on the touch panel appearing in FIG. 2.

Referring to FIG. 6, the CPU 102 calls the copy application, and displays a copy setting screen 700 shown in FIG. 7A on the touch panel 200 (step S601). The copy setting screen 700 is formed by an area 701 and a plurality of operation buttons. The setting values of color, magnification, sheet size, the number of copies, etc., are displayed in the area 701. A settings confirmation button 702 is an operation button for prompting the user to confirm details of the copy settings set on the copy settings screen 700. A preview image of a printed result of a copy job using the copy settings set on the copy settings screen 700 is displayed on the settings confirmation button 702. When the settings confirmation button 702 is pressed by the user, a screen (not shown) showing detailed information of the copy settings set on the copy settings screen 700 is displayed on the touch panel 200.

Figure 7B:
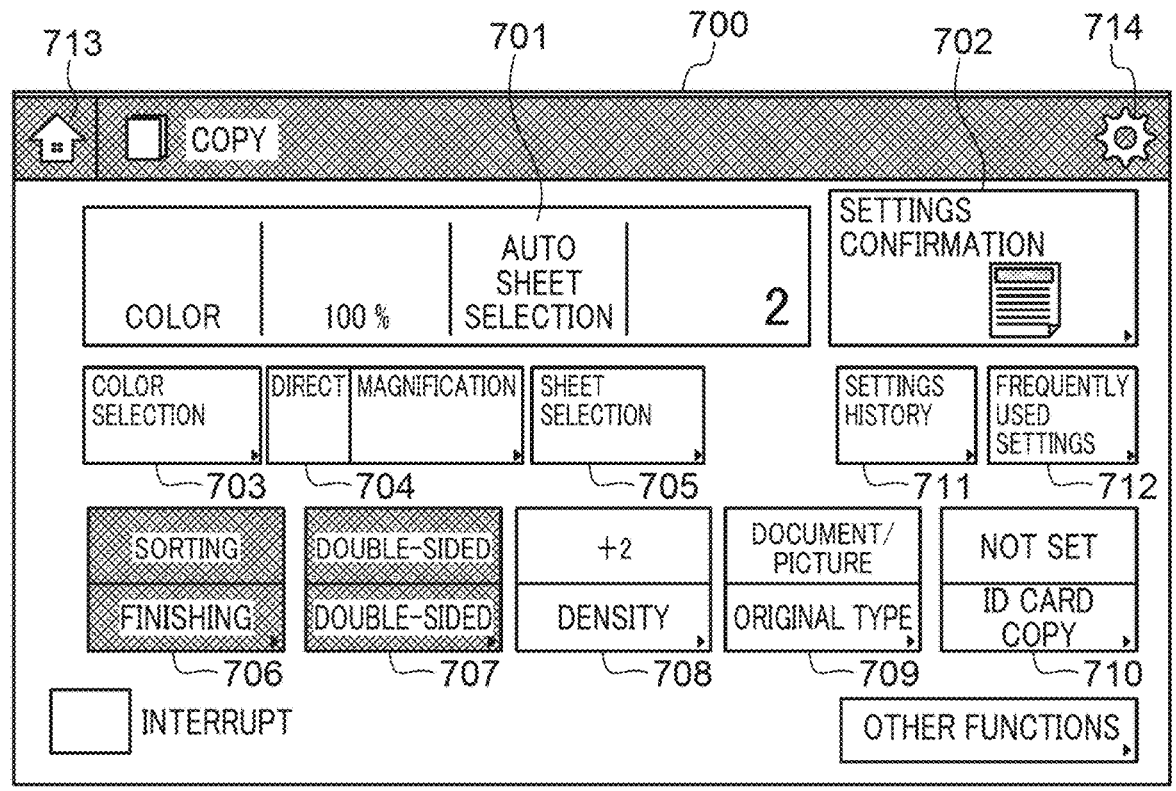

A color selection button 703, a magnification button 704, a sheet selection button 705, a finishing button 706, a double-sided print button 707, a density button 708, an original type button 709, and an ID copy button 710 are operation buttons for setting the copy settings. In the step S601, as described hereinabove, the copy settings screen 700 is displayed in a state in which are set initial values included in the default settings which are selected in advance from between the apparatus default settings and the user default settings. When the user presses the start key 201 in this state, the copy job is executed with the copy settings having the initial values set for the respective setting items. Further, when the user inputs different setting values from the initial values for some of the setting items on the copy settings screen 700, for example, for "color selection", "the number of copies", and "density", as shown in FIG. 7B, the copy job is executed with the copy settings in which the some of the setting items are set to the different setting values from the initial values thereof.

Figure 8:
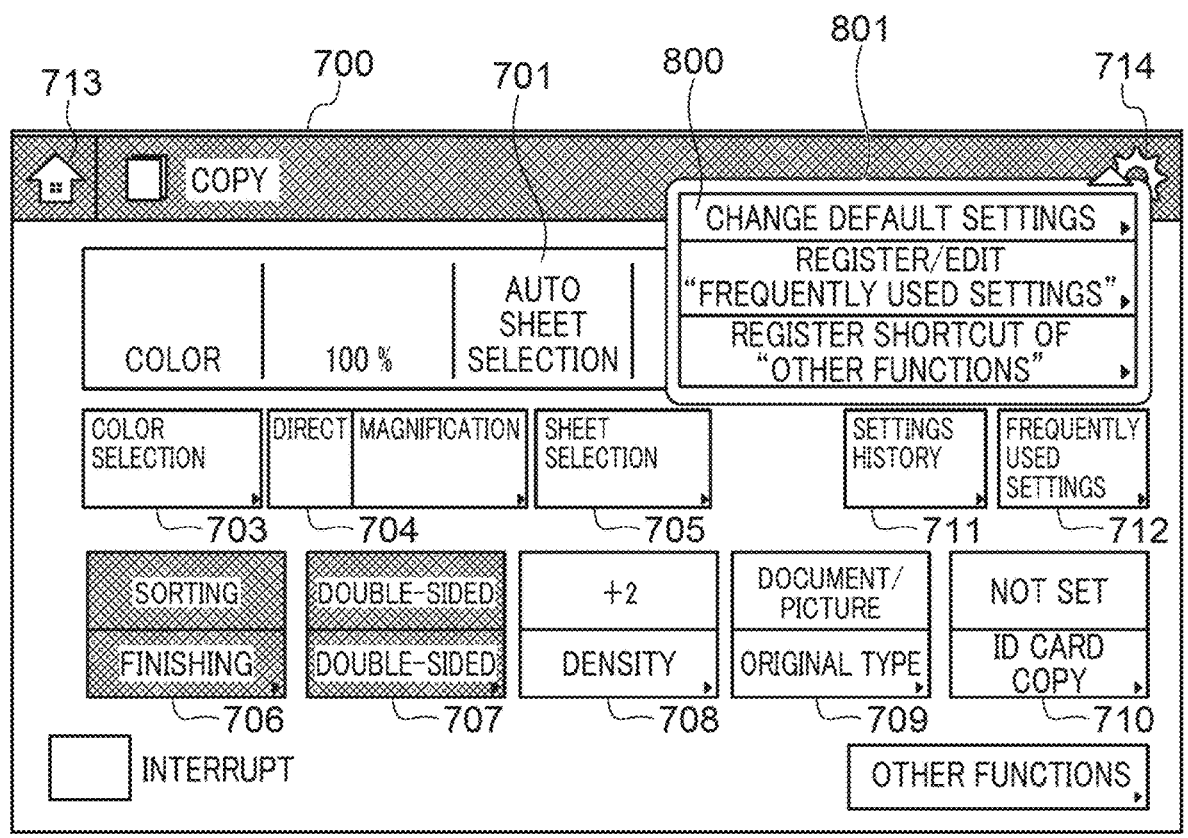
FIG. 8 is a view showing an example of the copy setting screen displayed on the touch panel appearing in FIG. 2.

A history button 711 is an operation button for displaying the history records of copy settings which were once used, on the touch panel 200. A settings registration button 712 is an operation button for displaying a screen for registering or editing the copy settings which are frequently used by the user. A home button 713 is an operation button for changing the display of the touch panel 200 to the home screen 500. A setting button 714 is an operation button for displaying the setting items related to the entire copy application on the touch panel 200. When the setting button 714 is pressed by the user, a menu 801 including a default settings-changing button 800 (change instruction-receiving unit), and so forth is displayed, as shown in FIG. 8. The default settings-changing button 800 is a button for changing the default settings. When the default settings-changing button 800 is pressed, the values set on the copy settings screen 700 at a time when the default settings-changing button 800 is pressed are registered as the user default settings. In the present embodiment, when an instruction for displaying the copy settings screen 700 is received after the user default settings have been registered, the copy settings screen 700 is displayed on the touch panel 200 in a state in which the values registered as the user default settings are set.

Referring again to FIG. 6, when the copy settings have been set on the copy settings screen 700 and then the start key 201 is pressed by the user (YES to a step S602), the CPU 102 executes the copy job using the set copy settings (step S603). Then, the CPU 102 stores job settings data in the HDD 104 (step S604). The job settings data includes information on date and time at which the copy job was executed and the copy settings used for the copy job (hereinafter referred to as the "used copy settings"). The used copy settings stored in the HDD 104 are managed by a copy settings management table 901 shown in FIG. 9A. In the present embodiment, a plurality of setting management tables each associated with a job type are stored in the HDD 104. The copy settings management table 901 is stored in a memory area in the HDD 104 allocated to the copy function. The copy settings management table 901 manages the copy settings. The initial values of the copy settings included in the apparatus default settings are set in a first row of the copy settings management table 901 in advance. Further, the initial values of the copy settings included in the user default settings registered by using the default settings-changing button 800 are set in a second row of the copy settings management table 901 in advance. Note that in a case where the user default settings have not been registered, no value is set for each item in the second row, as shown in FIG. 9B. The used copy settings stored in the step S604 are set in a third row of the copy settings management table 901. After that, the CPU 102 terminates the present process.

Figure 10:
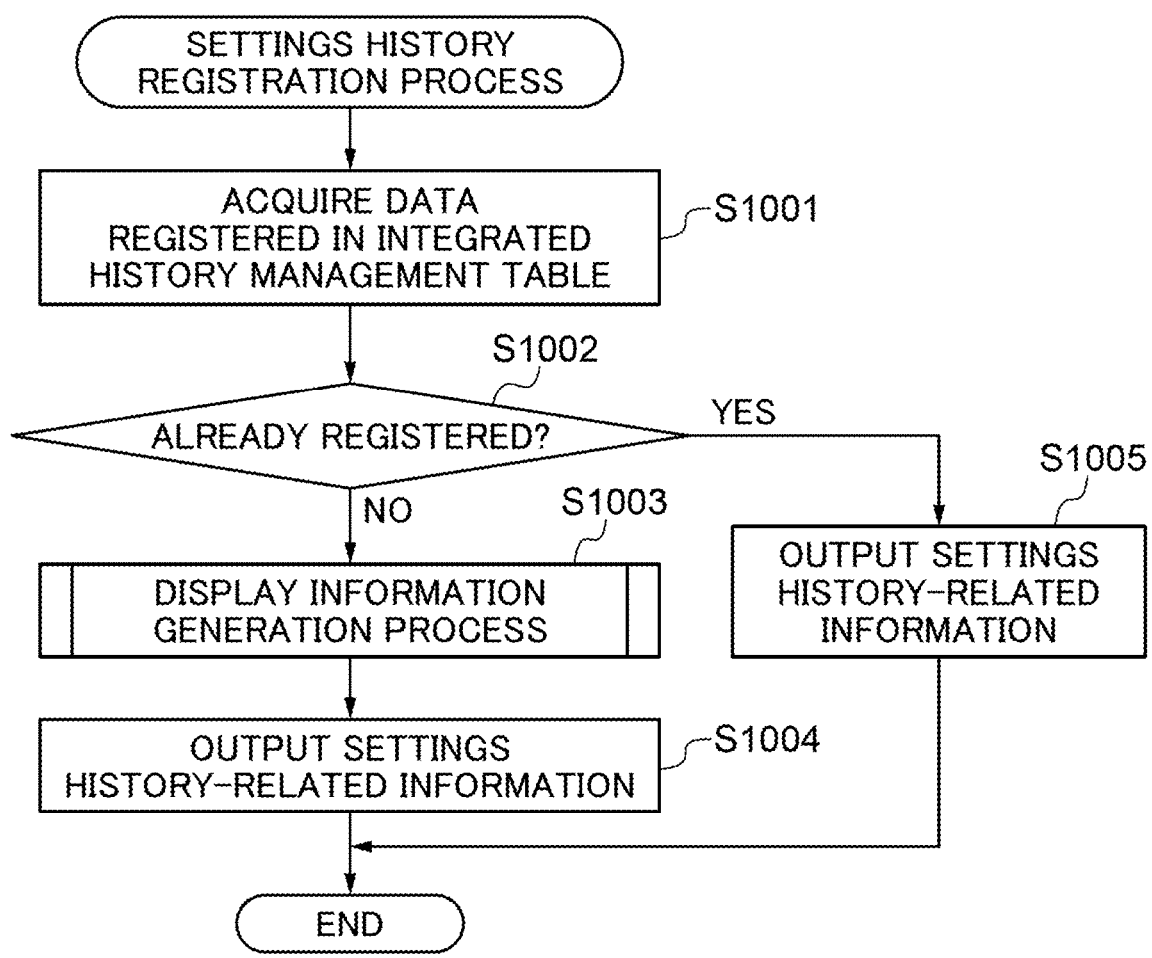
FIG. 10 is a flowchart of a settings history registration process performed by the MFP shown in FIG. 1.

FIG. 10 is a flowchart of a settings history registration process performed by the MFP 100 shown in FIG. 1. The process in FIG. 10 is also performed by the CPU 102 that executes an associated program stored in the HDD 104 or the ROM 105. Further, the process in FIG. 10 is performed when execution of a job is completed. Note that in the process in FIG. 10, it is assumed that execution of a copy job is completed by performing the process in FIG. 6, by way of example.

Referring to FIG. 10, the CPU 102 acquires data registered in an integrated history management table 1100, shown in FIG. 11A, which is stored in the HDD 104 (step S1001). The integrated history management table 1100 manages settings history-related information items associated with respective settings history buttons displayed in the integrated history 511. In the present embodiment, after execution of a job by the MFP 100, a settings history button display control process, described hereinafter with reference to FIG. 15, registers a settings history-related information item including setting values used for the executed job in the integrated history management table 1100. In the present embodiment, settings history buttons associated with respective registered settings history-related information items are displayed in the integrated history 511. The integrated history management table 1100 includes the items of button ID 1101, application ID 1102, application name 1103, data 1104, date and time 1105, setting text 1106, and setting icon 1107.

An identification (ID) number of a settings history button associated with a registered settings history-related information item is set as the button ID 1101. An ID number for identifying an application which executed a job indicated by the settings history-related information item is set as the application ID 1102. An ID number of "101" indicative of the copy application and an ID number of "201" indicative of a transmission application, for example, are each set as the application ID 1102. A name of job settings data including setting values used for a job is set as the data 1104. The job settings data includes, for example, the respective setting values of number of copies, color selection, magnification, sheet selection, page aggregation, double-sided printing, and finishing, which were used for the copy job. The job settings data is stored in the HDD 104 or the like in a data format which can be read by the application.

The date and time at which the job was executed are set as the date and time 1105. A character string to be displayed on the settings history button is set as the setting text 1106. An icon to be displayed on the settings history button is set as the setting icon 1107. A character string and an icon, indicating characteristic ones of the setting values of the job, are set as the setting text 1106 and the setting icon 1107, respectively. The user can recollect the setting contents of the job, based on the character string and the icon displayed on the settings history button, and grasp the setting values associated with the settings history button.

Referring again to FIG. 10, in the step S1001, specifically, the CPU 102 extracts a settings history-related information item, which includes the same application ID as that of the application started in the process in FIG. 6, of the settings history-related information items registered in the integrated history management table 1100. Further, the CPU 102 acquires the job settings data included in the extracted settings history-related information item. Then, the CPU 102 determines whether or not the job settings data stored in the step S604 (hereinafter referred to as the "stored job settings data") has been registered in the integrated history management table 1100 (step S1002). In the step S1002, for example, in a case where the acquired job settings data includes job settings data which coincides, in respect of all contents, with the stored job settings data, the CPU 102 determines that the stored job settings data has been registered in the integrated history management table 1100. On the other hand, in a case where the acquired job settings data does not include job settings data which coincides, in respect of all contents, with the stored job settings data, the CPU 102 determines that the stored job settings data has not been registered in the integrated history management table 1100.

If it is determined in the step S1002 that the stored job settings data has not been registered in the integrated history management table 1100, the CPU 102 performs a display information generation process, described hereinafter with reference to FIG. 12 (step S1003). In the step S1003, display information to be displayed on the settings history button is generated. Then, the CPU 102 outputs the settings history-related information to an integrated history application (not shown) that manages the integrated history management table 1100 (step S1004). This settings history-related information includes the application ID of the application started in the process in FIG. 6, information indicative of the stored job settings data, and information of the date and time at which the job using the stored job settings data was executed. The settings history-related information further includes information indicative of the result of the determination in the step S1002 and the display information generated in the process in the step S1003. After that, the CPU 102 terminates the present process.

If it is determined in the step S1002 that the stored job settings data has been registered in the integrated history management table 1100, the CPU 102 outputs the settings history-related information to the integrated history application (step S1005). This settings history-related information includes the application ID of the application started in the process in FIG. 6, the information of the date and time at which the job using the stored job settings data was executed, and the information indicative of the result of the determination in the step S1002. After that, the CPU 102 terminates the present process.

Figure 12:
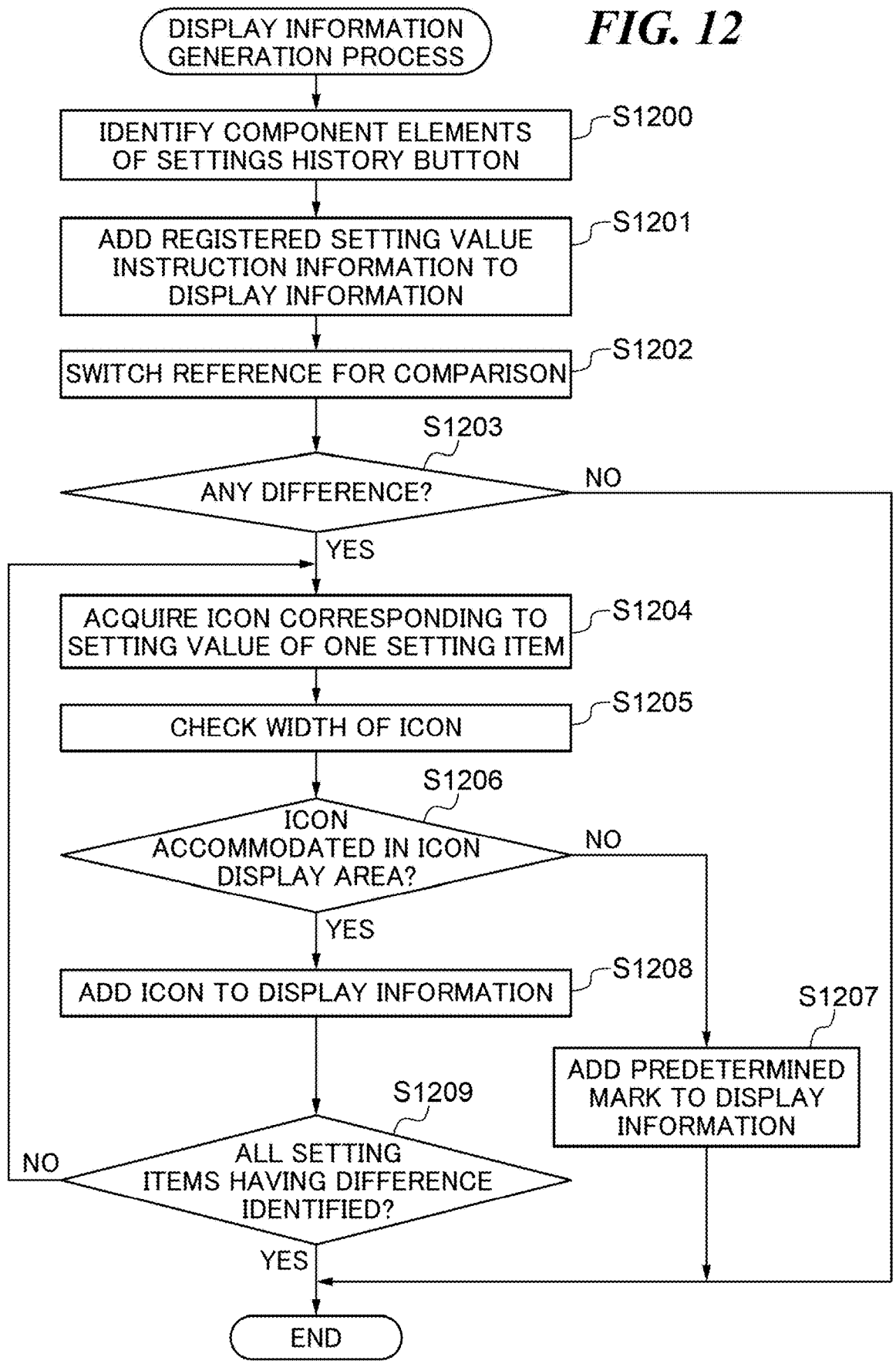
FIG. 12 is a flowchart of a display information generation process performed in a step in FIG. 10.

FIG. 12 is a flowchart of the display information generation process performed in the step S1003 in FIG. 10.

Referring to FIG. 12, the CPU 102 identifies component elements forming the settings history button for calling the stored job settings data (step S1200). In the present embodiment, characteristic setting values are defined as the above-mentioned component elements for each job type in advance, and the component elements for each job type are managed by a component element management table 1300 shown in FIG. 13. For example, in a case where an application using the stored job settings data is the copy application, the component elements are "date and time", "application icon", "application name", "number of copies", "color selection", "magnification", and "sheet selection". Then, the CPU 102 acquires data corresponding to each identified component element from the stored job settings data and an icon association table 1400 shown in FIG. 14. More specifically, the CPU 102 acquires the text data items indicative of "date and time", "application name", "number of copies", and "magnification". Further, the CPU 102 acquires "application icon", and respective icons indicative of "color selection" and "sheet selection". The CPU 102 adds the acquired data (hereinafter referred to as the "registered setting value instruction information") to the display information (step S1201).

Then, the CPU 102 identifies, out of predetermined setting items on the copy settings screen 700, those for which the user input setting values different from initial values thereof. More specifically, the CPU 102 performs processing for switching a reference for comparison (identification reference) (step S1202) (reference switching unit). In the present embodiment, the initial values included in the apparatus default settings registered at factory shipment are initially set as the reference for comparison. In the switching processing, in a case where not the apparatus default settings, but, for example, the user default settings are set to the default settings, the CPU 102 changes the reference for comparison from the initial values included in the apparatus default settings to the initial values included in the user default settings. Further, to identify setting items for which the user input setting values different from the initial values, the CPU 102 compares the setting values of the stored job settings data with the initial values as the reference for comparison, with respect to the predetermined setting items on the copy settings screen 700, respectively. The predetermined setting items are "page aggregation", "double-sided printing", "finishing", and "density", which are setting items other than "number of copies", "color selection", "magnification", and "sheet selection", corresponding to the identified component elements. As a result of the comparison, the CPU 102 determines whether or not there is a difference with respect to any one of the predetermined setting items (step S1203).

If it is determined in the step S1203 that there is a difference with respect to any one of the predetermined setting items, the CPU 102 identifies one of the setting items with respect to which there is a difference, based on the display priority set in advance. In the present embodiment, for example, the display priority is set in advance such that the highest display priority is assigned to "page aggregation", and the sequentially lower display priorities are assigned to "double-sided printing", "finishing", and "density" in the mentioned order. The CPU 102 extracts a setting value set for the identified setting item of the stored job settings data, and acquires an icon associated with the extracted setting value from the icon association table 1400 (step S1204). Then, the CPU 102 checks the width of the acquired icon (step S1205). Then, the CPU 102 determines whether or not the acquired icon can be accommodated in an icon display area 1604, described hereinafter with reference to FIG. 16A, of the settings history button (step S1206).

If it is determined in the step S1206 that the acquired icon cannot be accommodated in the icon display area 1604, the CPU 102 adds a predetermined mark to the display information (step S1207). The predetermined mark is e.g. an ellipsis " . . . " indicating that there is an icon which cannot be accommodated in the icon display area 1604. After that, the CPU 102 terminates the present process, and executes the step S1004 et seq.

If it is determined in the step S1206 that the acquired icon can be accommodated in the icon display area 1604, the CPU 102 adds the acquired icon to the display information as the setting value instruction information (setting value information) to be displayed in the icon display area 1604 (step S1208). Then, the CPU 102 determines whether or not all of the setting items with respect to each of which there is a difference have been identified (step S1209).

If it is determined in the step S1209 that there remains any unidentified setting item with respect to which there is a difference, the CPU 102 identifies a remaining unidentified setting item with respect to which there is a difference, based on the display priority, and returns to the step S1204.

If it is determined in the step S1209 that all of the setting items with respect to each of which there is a difference have been identified, the CPU 102 terminates the present process, and executes the step S1004 et seq.

If it is determined in the step S1203 that there is no difference with respect to all of the predetermined setting items, the CPU 102 terminates the present process, and executes the above-described step S1004 et seq. That is, in the present embodiment, for example, in a case where there is no difference with respect to all of the predetermined setting items, e.g. between the user default settings and the stored job settings data as in the case of the copy settings management table shown in FIG. 9C, the setting value instruction information to be displayed in the icon display area is not included in the display information.

In FIG. 12, the description is given of the case where the stored job settings data is compared with one of the apparatus default settings and the user default settings. Next, a description will be given of a variation of the display information generation process in which the stored job settings data is compared with both of the apparatus default settings and the user default settings with reference to FIG. 25.

FIG. 25 is a flowchart of the variation of the display information generation process performed in the step S1003 in FIG. 10.

Referring to FIG. 25, the CPU 102 identifies component elements forming the settings history button for calling the stored job settings data (step S2500). In the present embodiment, characteristic setting values are defined as the above-mentioned component elements for each job type in advance, and the component elements for each job type are managed by the component element management table 1300 shown in FIG. 13. For example, in a case where an application using the stored job settings data is the copy application, the component elements are "date and time", "application icon", "application name", "number of copies", "color selection", "magnification", and "sheet selection". Then, the CPU 102 acquires data corresponding to each identified component element from the stored job settings data and the icon association table 1400 shown in FIG. 14. More specifically, the CPU 102 acquires the text data items indicative of "date and time", "application name", "number of copies", and "magnification". Further, the CPU 102 acquires "application icon" and respective icons indicative of "color selection" and "sheet selection". The CPU 102 adds the acquired data (hereinafter referred to as the "registered setting value instruction information") to the display information (step S2501).

Then, the CPU 102 identifies, out of predetermined setting items on the copy settings screen 700, those for which the user input settings different from initial values thereof. The predetermined setting items are "page aggregation", "double-sided printing", "finishing", and "density", which are setting items other than "number of copies", "color selection", "magnification", and "sheet selection", corresponding to the identified component elements. The CPU 102 identifies one of the predetermined setting items, based on the display priority set in advance. In the present embodiment, for example, the display priority is set in advance such that the highest display priority is assigned to "page aggregation", and the sequentially lower display priorities are assigned to "double-sided printing", "finishing", and "density" in the mentioned order.

The CPU 102 compares a setting value of the user default settings and a setting value of the stored job settings data with respect to the one setting item, and determines whether or not there is a difference (step S2502).

If it is determined in the step S2502 that there is a difference with respect to the one setting item, the CPU 102 extracts the setting value set for the one setting item out of the stored job settings data. Then, the CPU 102 acquires an icon associated with the extracted setting value from the icon association table 1400 (step S2503). Then, the CPU 102 checks the width of the acquired icon (step S2504). Then, the CPU 102 determines whether or not the acquired icon can be accommodated in the icon display area 1604 of the settings history button (step S2505).

If it is determined in the step S2505 that the acquired icon cannot be accommodated in the icon display area 1604, the CPU 102 adds a predetermined mark to the display information (step S2507). The predetermined mark is e.g. an ellipsis " . . . " indicating that there is an icon which cannot be accommodated in the icon display area 1604. After that, the CPU 102 terminates the present process, and executes the step S1004 et seq.

If it is determined in the step S2505 that the acquired icon can be accommodated in the icon display area 1604, the CPU 102 adds the acquired icon to the display information as the setting value instruction information (setting information) to be displayed in the icon display area 1604 (step S2506). Then, the CPU 102 determines whether or not all of the predetermined setting items have been identified (step S2514).

If it is determined in the step S2514 that there remains any unidentified setting item, the CPU 102 identifies a remaining unidentified setting item from the predetermined setting items based on the display priority, and returns to the step S2502.

If it is determined in the step S2514 that all of the setting items for have been identified, the CPU 102 terminates the present process, and executes the step S1004 et seq.

If it is determined in the step S2502 that there is no difference from the user default settings with respect to the one setting item, the CPU 102 compares a setting value of the apparatus default settings and the setting value of the stored job settings data, and determines whether or not there is a difference (step S2508).

If it is determined in the step S2508 that there is no difference with respect to the one setting item, the CPU 102 proceeds to the step S2514. On the other hand, if it is determined in the step S2508 that there is a difference with respect to the one setting item, the CPU 102 executes a step S2509.

The step S2509 and steps S2510 to S2512 are similar to the above-described steps S2503 to S2506, and hence description thereof is omitted.

Then, the CPU 102 adds flag information to the display information, indicating that there is a difference from the apparatus default settings with respect to the one setting item (step S2513). Then, the CPU 102 executes the step S2514 et seq. That is, for example, FIG. 9C shows a case where there is no difference between the user default settings and the stored job settings data with respect to all of the predetermined setting items, but there is a difference with respect to some of the settings between the apparatus default settings and the stored job settings data. In this case, in the present embodiment, the setting value instruction information to be displayed in the icon display area with a flag is included in the display information.

Figure 15:
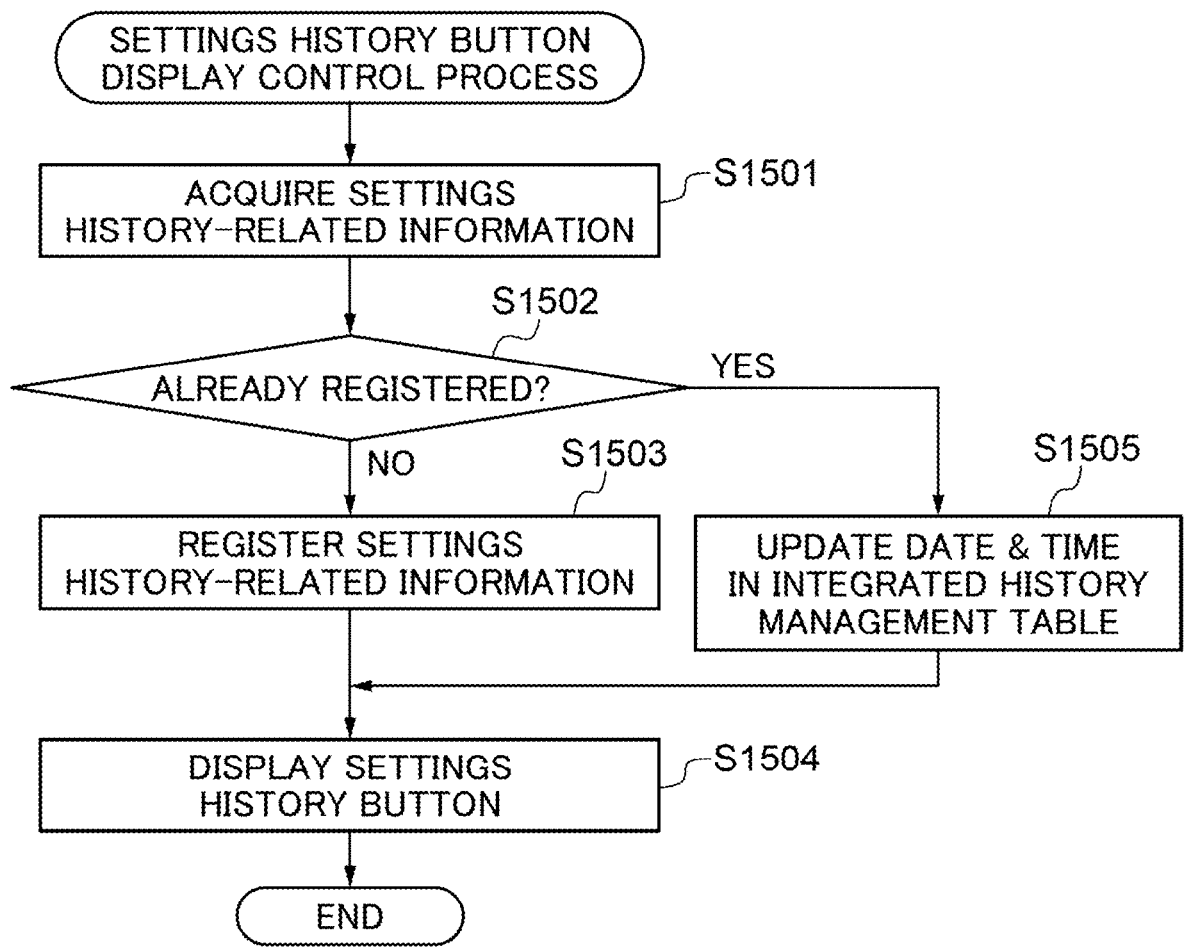
FIG. 15 is a flowchart of a settings history button display control process performed by the MFP shown in FIG. 1.

FIG. 15 is a flowchart of a settings history button display control process performed by the MFP 100 shown in FIG. 1. The process in FIG. 15 is also performed by the CPU 102 that executes an associated program stored in the HDD 104 or the ROM 105. Further, the process in FIG. 15 is performed when the process in FIG. 10 is completed.

Referring to FIG. 15, when the settings history-related information is acquired by the integrated history application (step S1501), the CPU 102 analyzes the acquired settings history-related information. The CPU 102 determines whether or not the stored job settings data has been registered in the integrated history management table 1100, based on a result of the determination in the step S1002, which is included in the acquired settings history-related information (step S1502).

If it is determined in the step S1502 that the stored job settings data has not been registered in the integrated history management table 1100, the CPU 102 registers the acquired settings history-related information in the integrated history management table 1100 (step S1503). Then, the CPU 102 sorts the settings history-related information items included in the integrated history management table 1100 by date, and re-arranges the settings history-related information items in descending date order. Then, the CPU 102 displays the settings history buttons associated with the settings history-related information items registered in the integrated history management table 1100, in the integrated history 511 (step S1504), followed by terminating the present process.

Further, in a case where the variation of the display information generation process shown in FIG. 5 has been executed, the CPU 102 may determine with respect to each setting item, based on the setting value instruction information included in the acquired settings history-related information, whether or not there has been added the flag information indicating that there is a difference from the apparatus default settings. In this case, the CPU 102 displays, in the integrated history 511, the settings history button 1601 by changing a form of display thereof such that a setting item with flag information is made different from a setting item without flag information (step S1504), followed by terminating the present process. For example, in the step S1504, a setting item with flag information is displayed by adding a mark indicative of the flag thereto. Further, the setting item with flag information is displayed in a color different from that of the setting item without flag information by changing brightness and saturation of the icon. This enables the user to judge whether a setting value of each setting item displayed on the settings history button is different from the user default settings, or is different from the apparatus default settings.

Figure 16A:
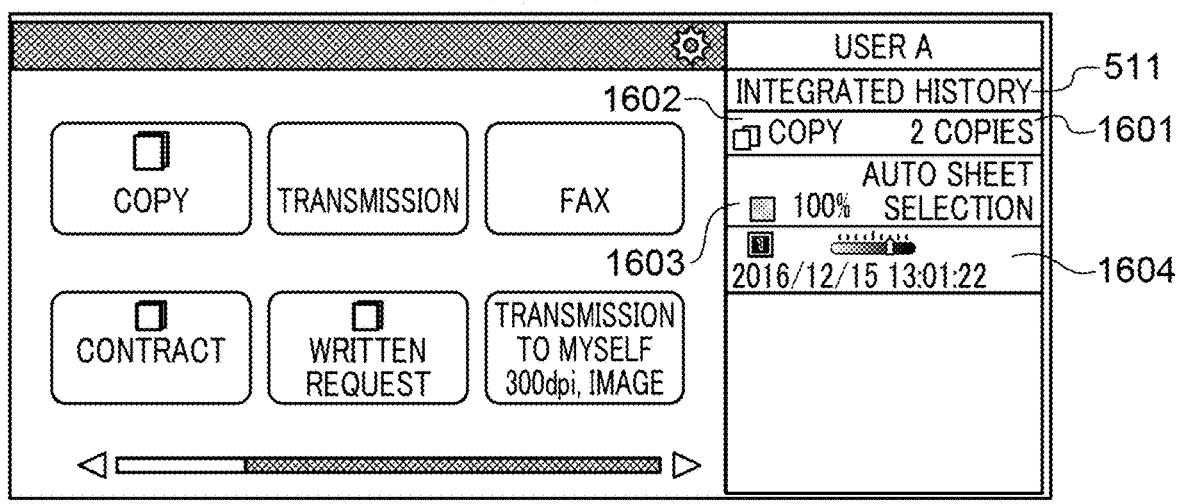
FIGS. 16A to 16C are views each showing an example of settings history buttons displayed on the touch panel appearing in FIG. 2.
Figure 17A:
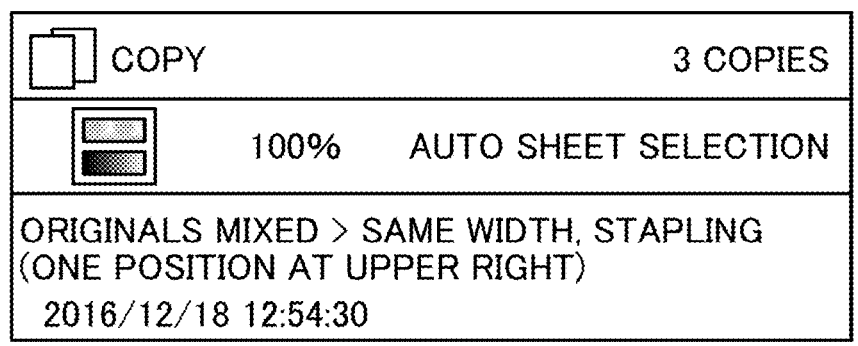
FIGS. 17A and 17B are diagrams useful in explaining a problem associated with the display of setting value instruction information in the present embodiment.
Figure 17B:
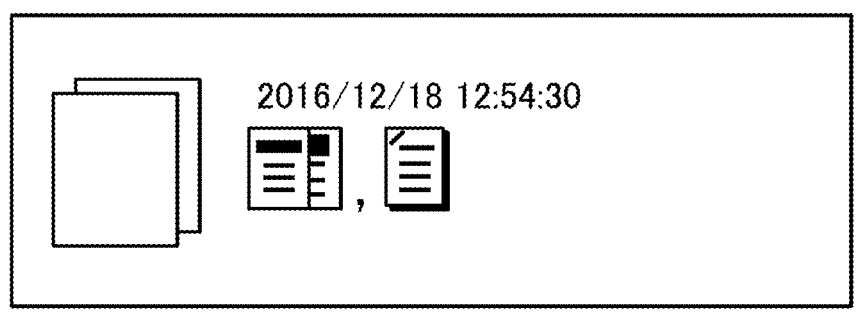

Further, in a case where settings history-related information 1108 shown in FIG. 11B is registered in the step S1503, the settings history button 1601 appearing in FIG. 16A is displayed in the integrated history 511, based on the settings history-related information 1108. In areas 1602 and 1603 of the settings history button 1601, the registered setting value instruction information included in the settings history-related information 1108, i.e. the text and the icon associated with the component elements managed by the component element management table 1300 are displayed. Further, in the icon display area 1604 of the settings history button 1601, the execution date and time of the job included in the settings history-related information 1108, and the setting value instruction information, i.e. the icons which indicate the setting values input by the user via the copy settings screen 700, which are different from the initial values, and setting contents of the job, are displayed. By thus displaying the setting value instruction information using icons, it is possible to display, compared e.g. with the case where the setting value instruction information is displayed by text, as shown in FIG. 17A, the setting value instruction information in the icon display area 1604 in a space saving manner (see e.g. FIG. 17B). As a result, it is possible to display more setting value instruction information in the icon display area 1604.

Figure 16B:
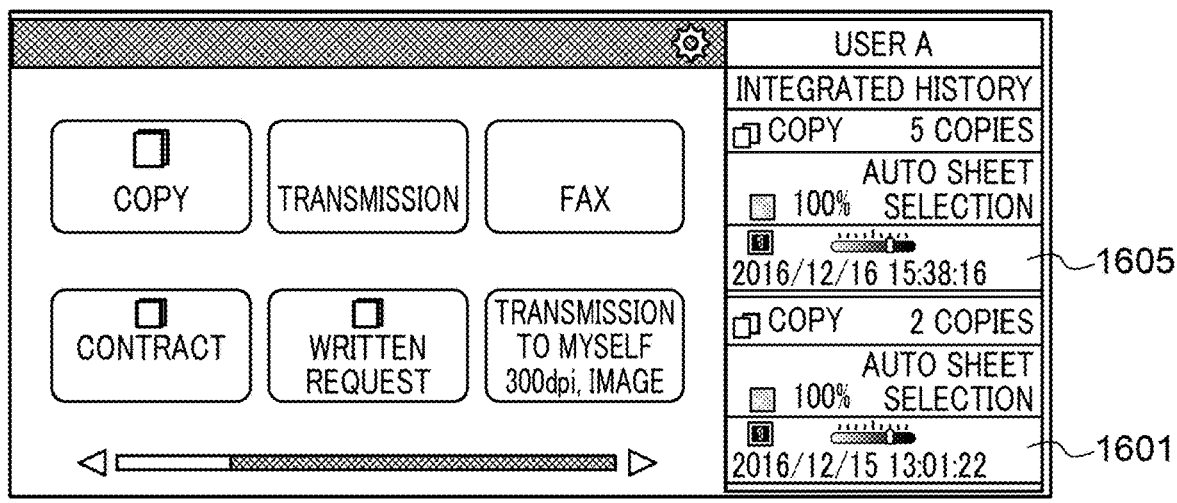

Further, in a case where settings history-related information 1109 shown in FIG. 11C is registered in the step S1503 in a state in which the settings history-related information 1108 has been registered, the settings history buttons are displayed in the integrated history 511 as shown in FIG. 16B. In the integrated history 511, the settings history button 1601 and a settings history button 1605 are arranged in descending date order, and the settings history button 1605 which is the latest in date is displayed at the top. In the present embodiment, if the number of settings history buttons is increased to such a large number as will make it impossible to accommodate the buttons in the integrated history 511, a scroll bar (not shown) is displayed in the integrated history 511. The user can cause settings history buttons outside a displayed area of the integrated history 511 to be displayed by using the scroll bar. Further, in a case where the number of the settings history buttons reaches a predetermined number, the settings history buttons are sequentially deleted, starting with the oldest one.

Figure 16C:
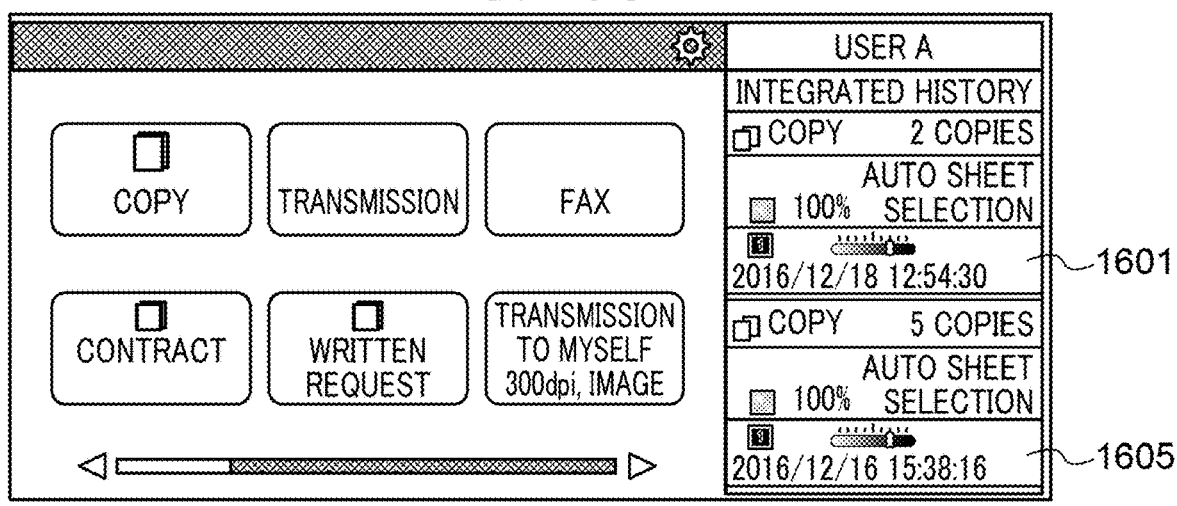

Referring again to FIG. 15, if it is determined in the step S1502 that the stored job settings data has been registered in the integrated history management table 1100, the CPU 102 updates the date and time 1105 of the integrated history management table 1100 (step S1505). More specifically, the CPU 102 changes the date and time 1105 of the settings history-related information including the job settings data which is different only in the date and time information from the stored job settings data to the date and time of the settings history-related information acquired in the step S1501, in the integrated history management table 1100. Then, the CPU 102 executes the step S1504 et seq. For example, in a case where the date and time 1105 of the settings history-related information 1108 is changed from that shown in FIG. 11B to that shown in FIG. 11D, the settings history button 1601 which is the latest in date is displayed at the top according to the date order, as shown in FIG. 16C.

FIG. 18 is a flowchart of an application starting process performed by the MFP 100 shown in FIG. 1. The process in FIG. 18 is also performed by the CPU 102 that executes an associated program stored in the HDD 104 or the ROM 105. Further, the process in FIG. 18 is performed when a settings history button displayed on the integrated history 511 is pressed by the user. For example, in the process in FIG. 18, it is assumed that the settings history button 1601 appearing in FIG. 16A is displayed on the touch panel 200.

Referring to FIG. 18, when the settings history button 1601 is pressed by the user, the CPU 102 acquires the settings history-related information 1108 associated with the settings history button 1601 from the integrated history management table 1100 (step S1801). Then, the CPU 102 calls the copy application indicated by the value of the application ID 1102 of the settings history-related information 1108. Then, the CPU 102 outputs the job settings data set as the data 1104 to the copy application, and starts the copy application (step S1802).

Then, the CPU 102 displays the copy settings screen 700 shown in FIG. 7B with the job settings data set thereon, on the touch panel 200, by the copy application (step S1803), followed by terminating the present process. After that, when the user sets the copy settings on the copy settings screen 700 displayed on the touch panel 200, and then presses the start key 201, the job settings data indicative of the above-mentioned copy settings is stored, and the above-described processes in FIGS. 10, 12, and 15 are performed. Here, in a case where not the start key 201, but the home button 713 on the copy settings screen 700 is pressed by the user when the copy settings screen 700 is being displayed, the display on the touch panel 200 is changed to the home screen 500. In this case, the copy job using the copy settings set on the copy settings screen 700 is not executed, and hence the settings history button for calling the settings set on the copy settings screen 700 is not generated.

According to the above-described embodiment, in a case where the initial values on the copy settings screen 700 are changed to initial values other than the initial values registered at factory shipment, the reference for comparison is switched to the other initial values. That is, even when the initial values on the copy settings screen 700 are changed to other initial values, the information associated with setting values input on the copy settings screen 700 by the user is accurately reflected on the settings history button 1601. This enables the user to recollect setting contents of the job, which are associated with the settings history button 1601, from information appearing on the settings history button 1601, and thereby grasp the setting values associated with the settings history button.

Further, according to the above-described variation (FIG. 25), it is possible to display differences from the user default settings and differences from the apparatus default settings on the settings history button 1601 in a distinguishable state. That is, both of information on setting values input by the user on the copy settings screen 700 and information on setting contents of the job are accurately reflected on the settings history button 1601. This enables the user to easily identify a desired settings history button based on the information on the setting values input by the user out of the information appearing on the settings history button 1601. Further, it is possible to cause the user to recollect setting contents of the job associated with the settings history button 1601 from the information on the setting contents of the job appearing on the settings history button 1601.

Further, in the above-described embodiment, the other initial values are the initial values included in the user default settings. This makes it possible to cause the user of the apparatus capable having different default settings set therefor on a user-by-user basis to easily recollect the setting contents of a job associated with the settings history button 1601 from information appearing on the settings history button 1601.

In the above-described embodiment, out of a plurality of setting values used for a copy job, each setting value different from its initial value as the reference for comparison is displayed on the settings history button 1601 using an icon. This makes it possible to display information indicative of each setting in a more space saving manner (see e.g. FIG. 17B), compared with the case where the setting values are each displayed by a character string (see e.g. FIG. 17A). As a result, in the icon display area 1604 which is limited in the displayable range, it is possible to provide more information to the user, which is intentionally input by the user on the copy settings screen 700.

Further, in the above-described embodiment, registered setting value instruction information associated with component elements managed at least by the component element management table 1300 and setting value instruction information are displayed on the settings history button 1601. That is, on the settings history button 1601, not only the setting values managed by the component element management table 1300, but also information indicative of the setting contents of the job is displayed. This makes it possible to provide various information which assists the user to recollect the setting contents of the job to the user.

Although the above description is given of the present invention with reference to the above-described embodiment, the present invention is not limited to the above-described embodiment. For example, icons having less characteristic features and having similar shapes, such as an icon 1401 indicative of "no stapling setting" and an icon 1402 indicative of "no punching setting", shown in the icon association table 1400, may be expressed in another display form. For example, such an icon may be replaced by a blank or a mark "?", as shown in an icon association table 1900 shown in FIG. 19.

Further, in the above-described embodiment, the user may be prompted to select which one to use, the icon association tables 1400 or 1900. This makes it possible to cause the user's intention to be reflected on the display form of the setting value instruction information.

In the above-described embodiment, in the icon display area 1604, such icons as described above which have less characteristic features and have similar shapes may not be displayed, but other icons may be displayed in an area where the above-described icons are to be disposed. For example, in a case where the icon acquired in the step S1204 is the same in characteristic part as an icon indicative of another setting value, the icon acquired in the step S1204 is not displayed in the icon display area 1604. Further, an icon indicative of another setting value which is lower in display priority than the setting value associated with the above-described icon and is different from an initial value as the reference for comparison is displayed in the area where the above-described icons are to be disposed. With this, it is possible to cause more icons indicative of setting values input by the user to be incorporated in the settings history button, and thereby cause the user to easily recollect the setting contents of the job associated with the settings history button 1601.

In the above-described embodiment, when the initial values on the copy settings screen 700 are changed to other initial values, the user may be caused to select whether or not to change the reference for comparison to the other initial values. This makes it possible to cause the user's intention to be reflected on the display of the setting value instruction information.

Further, in the above-described embodiment, the user may be caused to select whether or not to display a setting item having a flag added thereto, i.e. a setting item with a difference from a corresponding setting value of the apparatus default settings, on the settings history button 1601. This makes it possible to cause the user's intention to be reflected on the display of the setting value instruction information.

Further, in the above-described embodiment, the form of the settings history button 1601 may be changed based on selection on whether or not to change the reference for comparison to the other initial values. For example, when the change of the reference for comparison to the other initial values is selected, a mark indicative of this fact is displayed on the settings history button 1601. Alternatively, when the change of the reference for comparison to the other initial values is selected, the background of the settings history button 1601 is caused to be displayed in a color different from those of the other settings history buttons. This makes it possible to notify the user that the reference for comparison has been changed, and prevent the user from being confused due to the change of the reference for comparison.

Although in the above-described embodiment, the description is given of the case where a settings history button for calling copy settings is displayed, a settings history button for calling job settings of a type other than the copy settings may be displayed in the integrated history 511. For example, in a case where the MFP 100 has executed a transmission job for transmitting image data obtained by scan processing to an external apparatus, the CPU 102 stores the transmission settings used for the transmission job in the HDD 104 as the job settings data in the same manner as in the step S604. The transmission settings are managed by a transmission setting management table 902, shown in FIG. 9D, which is stored in the HDD 104. The initial values of the transmission settings included in the apparatus default settings are set in a first row of the transmission setting management table 902 in advance. Further, only in a case where user default settings are registered, the initial values of the transmission setting included in the registered user default settings are set in a second row of the transmission setting management table 902 in advance. The transmission settings stored in the HDD 104 are set in a third row of the transmission setting management table 902.

Figure 21:
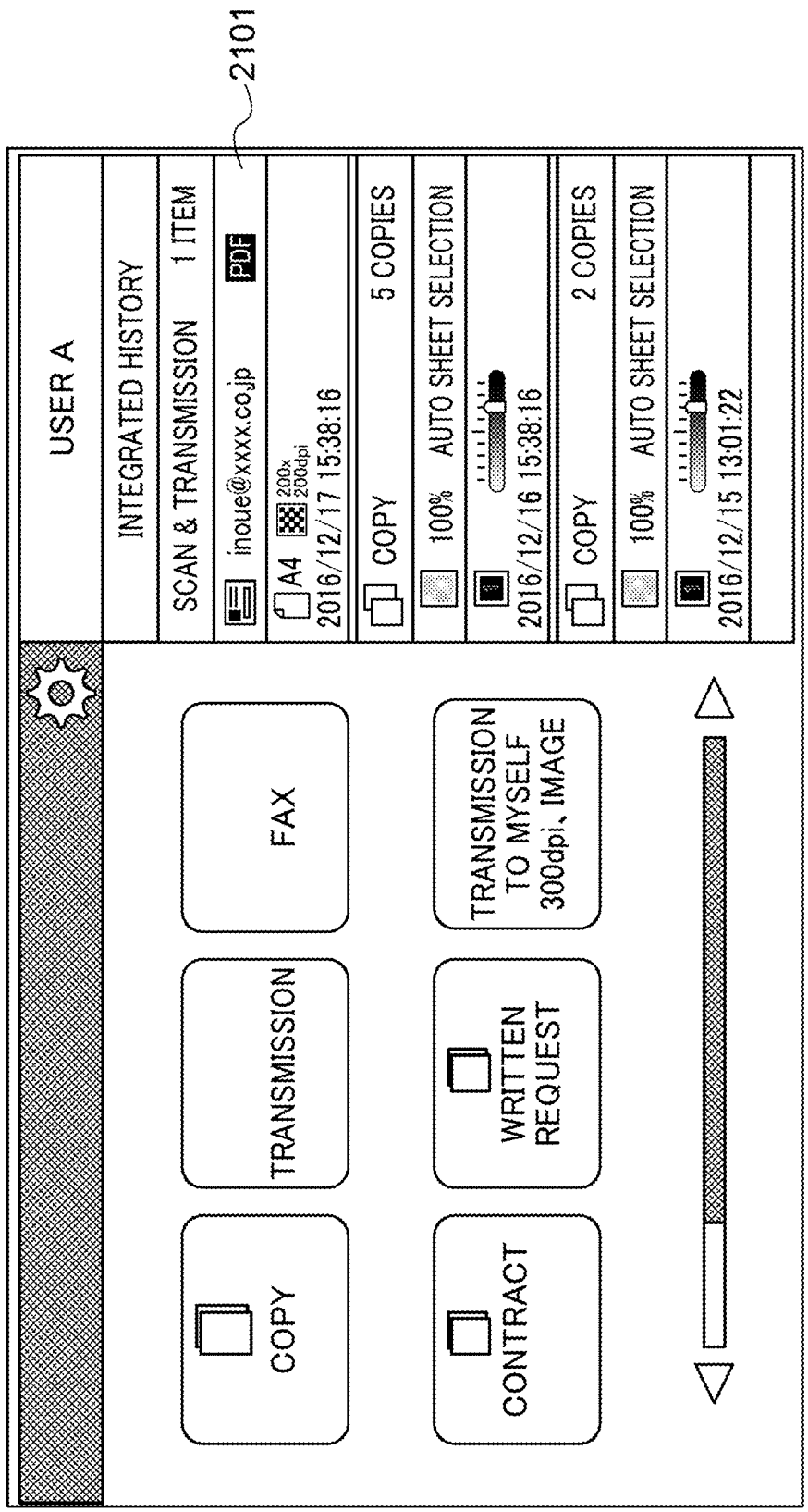
FIG. 21 is a view showing an example of the settings history buttons displayed on the touch panel appearing in FIG. 2.

When the transmission settings stored in the HDD 104 are set in the transmission setting management table 902, the CPU 102 performs the above-described processes in FIGS. 10 and 12 to generate the display information of a settings history button using an icon association table 2000 shown in FIG. 20. When the process in FIG. 10 is completed, the CPU 102 performs the process in FIG. 15. If the job settings data indicative of the transmission settings stored in the HDD 104 has not been registered in the integrated history management table 1100 (NO to the step S1502), the CPU 102 executes the step S1503. In the step S1503, settings history-related information 1110 shown in FIG. 11E, associated with the transmission settings stored in the HDD 104, is registered in the integrated history management table 1100. Then, in the step S1504, the CPU 102 causes a settings history button 2101 appearing in FIG. 21 for calling the transmission settings stored in the HDD 104 to be displayed at the top of the integrated history 511.

In the above-described embodiment, the icon association tables 1400 and 2000, which are different on a function type basis, are managed. This makes it possible to display proper icons associated with settings on a settings history button of each function.

In the above-described embodiment, in a case where the user has changed the default settings to the user default settings by operating the default settings-changing button 800, a notification to the effect that the default settings have been changed may be displayed on the touch panel 200. By doing this, it is possible to prevent the user from being confused due to the change of the default settings.

Further, in the above-described embodiment (FIG. 10), the display information to be displayed on the settings history button 1601 is generated after execution of the job is completed. That is, even when the user changes the default settings by operating the default settings-changing button 800, the settings history-related information which has already been registered is not updated.

More specifically, assuming, for example, that in a case where a setting of "2in1" is set for the page aggregation setting as one of the user default settings, the user inputs another setting value of "4in1" which is different from the one of the user default settings, and instructs execution of the job. Then, in the step S1203 in FIG. 12, it is determined that there is a difference with respect to the page aggregation setting, and this setting is added to the display information in the step S2506. Then, in the step S1504 in FIG. 15, the setting value of "4in1" of the setting item of page aggregation is displayed on the settings history button.

In this state, the user changes the page aggregation setting of the user default settings to the setting value of "4in1". However, according to the process in FIG. 10, the registered display information is not changed even when a change is made to the user default settings, and hence contents displayed for the settings history button which has already been registered are not changed whenever a change is made to the user default settings. As a result, the setting values intentionally input by the user when the user executes the job are displayed on the settings history button even after a change is made to the user default settings.

Further, in the above-described embodiment, in a case where the user has changed any of the default settings by operating the default settings-changing button 800, the contents displayed in the integrated history 511 may be updated.

Figure 22:
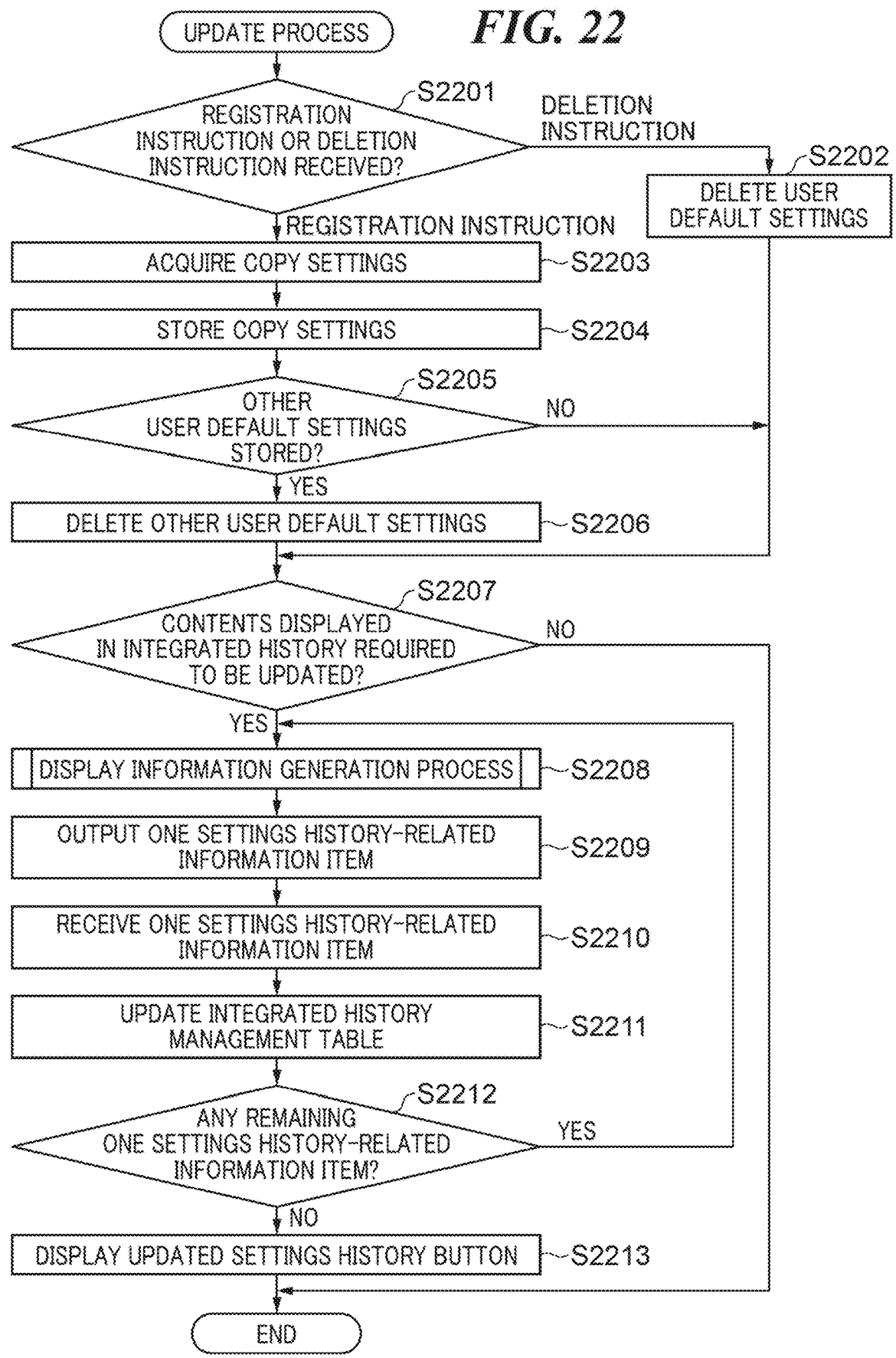
FIG. 22 is a flowchart of an update process performed by the MFP shown in FIG. 1.

FIG. 22 is a flowchart of an update process performed by the MFP 100 shown in FIG. 1. The process in FIG. 22 is also performed by the CPU 102 that executes an associated program stored in the HDD 104 or the ROM 105. Further, the process in FIG. 22 is performed when the user has changed the default settings by operating the default settings-changing button 800. The case where the default settings has been changed is e.g. a case where the default settings are changed to new registered user default settings or a case where the user default settings are deleted and the default settings are changed to the apparatus default settings. In the present embodiment, an instruction for changing the default settings can be received on a job type basis. In the process in FIG. 22, it is assumed that the MFP 100 has received one of an instruction for registering user default settings concerning the copy settings and an instruction for deleting the same.

Referring to FIG. 22, the CPU 102 determines which one of the instruction for registering the user default settings concerning the copy settings and the instruction for deleting the user default settings concerning the copy settings has been received from the user (step S2201).

If it is determined in the step S2201 that the instruction received from the user is the instruction for deleting the user default settings concerning the copy settings, the CPU 102 deletes the user default settings concerning the copy settings from the HDD 104 (step S2202). Further, the CPU 102 deletes the setting values in the second row of the copy settings management table 901, as shown in FIG. 9B. Then, the CPU 102 executes a step S2207, described hereinafter.

If it is determined in the step S2201 that the instruction received from the user is the instruction for registering the user default settings concerning the copy settings, the CPU 102 acquires the copy settings set on the copy settings screen 700 being displayed (step S2203). Then, the CPU 102 stores the acquired copy settings in the HDD 104 (step S2204). Then, the CPU 102 determines whether or not other user default settings concerning the copy settings have been stored in the HDD 104 (step S2205). The other user default settings are the user default settings which were used immediately before receiving the registration instruction.

If it is determined in the step S2205 that the other user default settings have not been stored in the HDD 104, the CPU 102 sets the copy settings stored in the HDD 104 in the second row of the copy settings management table 901, and executes the step S2207, described hereinafter.

If it is determined in the step S2205 that the other user default settings have been stored in the HDD 104, the CPU 102 deletes the other user default settings from the HDD 104 (step S2206). Further, the CPU 102 changes the setting values in the second row of the copy settings management table 901 to the copy settings stored in the HDD 104. Then, the CPU 102 determines whether or not it is required to update the contents displayed in the integrated history 511 (step S2207). In the step S2207, for example, the CPU 102 identifies the application ID "101" of the copy application for which the situation of registration of the user default settings was changed by executing the step S2202 or S2204, described above. The CPU 102 compares the identified application ID "101" with the application ID included in each settings history-related information registered in the integrated history management table 1100. As a result of the comparison, in a case where an application ID coinciding with the identified application ID "101" is included in the integrated history management table 1100, the CPU 102 determines that it is necessary to update the contents displayed in the integrated history 511. On the other hand, as a result of the comparison, in a case where an application ID coinciding with the identified application ID "101" is not included in the integrated history management table 1100, the CPU 102 determines that it is unnecessary to update the contents displayed in the integrated history 511.

If it is determined in the step S2207 that it is unnecessary to update the contents displayed in the integrated history 511, the CPU 102 terminates the present process. If it is determined in the step S2207 that it is necessary to update the contents displayed in the integrated history 511, the CPU 102 identifies one settings history-related information item including the identified application ID "101" from the integrated history management table 1100. Then, the CPU 102 performs the above-described display information generation process in FIG. 12 (step S2208).

In the step S2208, for example, in a case where the user default settings have been deleted from the HDD 104 by executing the step S2202, the CPU 102 sets the apparatus default settings as the reference for comparison. On the other hand, in a case where new user default settings have been registered by executing the step S2204, the CPU 102 sets the registered new user default settings as the reference for comparison. Then, the CPU 102 outputs the updated one settings history-related information item to the integrated history application (step S2209). This one settings history-related information item includes only the value of the button ID 1101 acquired in the step S2208 and the setting value instruction information generated in the step S2208. Then, when the one settings history-related information item is received by the integrated history application (step S2210), the CPU 102 updates the integrated history management table 1100 based on the setting value instruction information included in the one settings history-related information item (step S2211). In the step S2211, for example, the CPU 102 updates only the value of the setting icon 1107 of the one settings history-related information item in the integrated history management table 1100 based on the setting value instruction information, as from the integrated history management table 1100 shown in FIG. 11B to that shown in FIG. 11F. Then, the CPU 102 determines whether or not any settings history-related information item required to be updated remains in the integrated history management table 1100 (step S2212).

If it is determined in the step S2212 that there remains any settings history-related information item required to be updated in the integrated history management table 1100, the CPU 102 returns to the step S2208. If it is determined in the step S2212 that no settings history-related information item required to be updated remains in the integrated history management table 1100, the CPU 102 sorts the settings history-related information items included in the integrated history management table 1100 in the date order. Then, the CPU 102 displays the updated settings history buttons in the integrated history 511 (step S2213), followed by terminating the present process.

In the above-described embodiment, in a case where the default settings are changed, the contents displayed in the integrated history 511 are updated from the contents displayed immediately before the change of the default settings, based on the initial values included in the changed default settings. With this, it is possible to prevent settings history buttons generated based on a different reference for comparison from being mixed in the integrated history 511, and it is possible to prevent the user from being confused due to mixture of settings history buttons generated based on the different references of comparison in the integrated history 511.

Further, although in the above-described embodiment, in the process in FIG. 12, the description is given of the case where the display priority set in advance is used when generating the setting value instruction information, this is not limitative, but the display priority may be caused to be set by the user.

Figure 23:
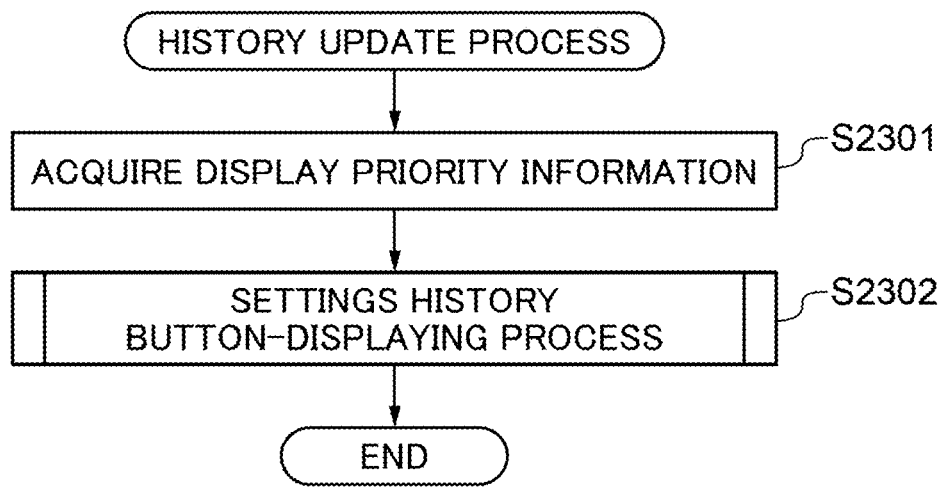
FIG. 23 is a flowchart of a history update process performed by the MFP shown in FIG. 1.

FIG. 23 is a flowchart of a history update process performed by the MFP 100 shown in FIG. 1. The process in FIG. 23 is also performed by the CPU 102 that executes an associated program stored in the HDD 104 or the ROM 105. Further, the process in FIG. 23 is performed when the user presses the setting button 510, and further presses a display priority-setting button 2401 appearing in FIG. 24 to set the display priority.

Referring to FIG. 23, the CPU 102 acquires the display priority set by the user (step S2301), and executes the above-described steps S2207 to S2213 (hereinafter referred to as the "settings history button-displaying process") (step S2302). The CPU 102 compares, for example, in the step S2207, the display priority set in advance and the display priority set by the user. As a result of the comparison, if the display priority set in advance does not coincide with the display priority set by the user, the CPU 102 determines that it is necessary to update the contents displayed in the integrated history 511. On the other hand, if the display priority set in advance coincides with the display priority set by the user, the CPU 102 determines that it is unnecessary to update the contents displayed in the integrated history 511. Further, the CPU 102 generates the setting value instruction information based on the display priority set by the user, and displays the settings history button including the generated setting value instruction information on the touch panel 200. After that, the CPU 102 terminates the present process.

In the above-described embodiment, since the display priority is set by the user, it is possible to preferentially display, on the settings history button, the setting value instruction information indicative of characteristic setting values which cause the user to easily recollect the setting contents of the job.

Although in the above-described embodiment, the description is given of the configuration in which either the apparatus default settings or the user default settings can be set as the default settings, this is not limitative. For example, the MFP 100 may be configured such that only the apparatus default settings can be set as the default settings, and further, the user may be enabled to edit the registered contents of the apparatus default settings. In the MFP 100 configured as above, for example, the copy settings are managed by a copy settings management table 903 shown in FIG. 9F, and comparison between the settings in the first row and the settings in the second row is performed in the process in FIG. 12. With this configuration, in the apparatus for which only the apparatus default settings can be set as the default settings, it is possible to cause the user to easily recollect the setting contents of a job associated with the settings history button 1601 from the information displayed on the settings history button 1601.

Although in the above-described embodiment, the description is given of the case where the present invention is applied to the MFP as the information processing apparatus, application of the present invention to the MFP is not limitative. For example, the present invention may be applied to an apparatus that displays a settings history button for calling a destination used for a telephone function or a mail function, in the integrated history 511, such as a mobile terminal, a tablet terminal, and a client terminal.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-060343 filed Mar. 27, 2018 and Japanese Patent Application No. 2019-015847 filed Jan. 31, 2019 which are hereby incorporated by reference herein in their entirety.

What is claimed is:

1. An information processing apparatus that displays a setting screen for setting a plurality of setting values used for a function selected by a user, in a state where initial values registered at factory shipment are set thereon, the information processing apparatus comprising:
a memory storing instructions; and
a controller including a processor that implements the instructions to execute a plurality tasks, including:
a control task that controls execution of the function that uses the plurality of setting values set on the setting screen;
a display control task that controls displaying of a settings-history button for calling the plurality of setting values used for the function according to execution of the function;
a reference switching that switches an identification reference for use in identifying, from the plurality of setting values used for the function, a setting value that is different from an initial value thereof on the setting screen;
a generation task that generates setting value information indicative of the setting value identified based on the identification reference; and
a change instruction-receiving task that receives an instruction for changing the initial values on the setting screen to other initial values other than the initial values registered at factory shipment, wherein the display control task controls displaying of the setting value information for the settings-history button, and wherein in a case where the initial values on the setting screen are changed to the other initial values, the reference switching task switches the identification reference to the other initial values.

2. The information processing apparatus according to claim 1, wherein the other initial values are specific to the user who uses the information processing apparatus.

3. The information processing apparatus according to claim 1, wherein the other initial values are shared by all users who use the information processing apparatus.

4. The information processing apparatus according to claim 1, wherein in a case where the initial values on the setting screen are changed to the other initial values, the reference switching task prompts the user to select whether or not to change the identification reference to the other initial values.

5. The information processing apparatus according to claim 4, wherein the form of the settings-history button is changed based on selection of whether or not to change the identification reference to the other initial values.

6. The information processing apparatus according to claim 1, wherein in a case where the instruction for changing the initial values on the setting screen to the other initial values is received, contents displayed for the settings-history button are updated from contents displayed immediately before receiving the instruction for changing the initial values on the setting screen to the other initial values, based on the other initial values.

7. The information processing apparatus according to claim 1, wherein for the settings-history button, there are displayed at least the setting value information, and predetermined setting value information indicative of setting values, registered in advance, of the plurality of setting values used for the function.

8. he information processing apparatus according to claim 1, wherein even when the instruction for changing the initial values on the setting screen to the other initial values is received, the initial values on the setting screen are changed without updating the contents displayed for the settings-history button.

9. The information processing apparatus according to claim 1, wherein the setting value information is an icon indicative of the setting value, which is different from the initial value thereof on the setting screen, of the plurality of setting values used for the function.

10. The information processing apparatus according to claim 9, wherein:

a plurality of the icons are displayed for the settings-history button based on display priority registered in advance, and in a case where an icon indicative of one setting value, which is different from an initial value thereof on the setting screen, of the plurality of setting values used for the function is the same in characteristic part as an icon indicative of another setting value, the icon indicative of the one setting value is not displayed for the settings-history button, but an icon indicative of another setting value, which is lower in display priority than the one setting value and is different from an initial value thereof on the setting screen, of the plurality of setting values used for the function is displayed for the settings-history button.

11. The information processing apparatus according to claim 10, wherein the display priority is prompted to be set by the user.

12. The information processing apparatus according to claim 9, wherein the function is one of functions of a plurality of types, and management information for managing information associated with an icon associated with each setting value set on the setting screen is managed for each function.

13. The information processing apparatus according to claim 12, wherein the management information is provided in plurality for each function type, and the user is prompted to select one of a plurality of items of the management information to be used to generate the setting value information.

14. A method of controlling an information processing apparatus that displays a setting screen for setting a plurality of setting values used for a function selected by a user, in a state where initial values registered at factory shipment are set thereon, the method comprising:

controlling execution of the function which uses the plurality of setting values set on the setting screen;

controlling displaying of a settings-history button for calling the plurality of setting values used for the function according to execution of the function;

switching an identification reference for use in identifying, from the plurality of setting values used for the function, a setting value that is different from an initial value thereof on the setting screen;

generating setting value information indicative of the setting value identified based on the identification reference;

receiving an instruction for changing the initial values on the setting screen to other initial values than the initial values registered at factory shipment;

displaying the setting value information for the settings-history button; and switching, in a case where the initial values on the setting screen are changed to the other initial values, the identification reference to the other initial values.

15. A non-transitory computer-readable storage medium storing a computer-executable program executable by a computer to execute a method of controlling an information processing apparatus that displays a setting screen for setting a plurality of setting values used for a function selected by a user, in a state where initial values registered at factory shipment are set thereon, the method comprising:

controlling execution of the function which uses the plurality of setting values set on the setting screen;

controlling displaying of a settings-history button for calling the plurality of setting values used for the function according to execution of the function;

switching an identification reference for use in identifying, from the plurality of setting values used for the function, a setting value that is different from an initial value thereof on the setting screen;

generating setting value information indicative of the setting value identified based on the identification reference;

receiving an instruction for changing the initial values on the setting screen to other initial values than the initial values registered at factory shipment;

displaying the setting value information for the settings-history button; and switching, in a case where the initial values on the setting screen are changed to the other initial values, the identification reference to the other initial values.

16. An information processing apparatus providing a plurality of functions including a printing function, the information processing apparatus comprising:
- at least one memory storing instructions and a plurality of setting values of a job executed using at least one function included in the plurality of functions; and
- a controller including a processor that implements the instructions to execute a plurality tasks, including:
  - a display control task that controls displaying of at least a history button for calling the plurality of setting values of the executed job on a display device; and
  - an executing task that executes a job based on the plurality of setting values called according to a selection of the history button,
- wherein the at least one memory stores default setting values of the printing function, and
- wherein the display control task controls displaying of at least part of differences between the plurality of setting values of the executed job and the default setting values currently being registered, in the history button.

17. The information processing apparatus according to claim 16, wherein:
- the plurality of tasks include a changing task that changes the default setting values, and
- in a case where the default setting values are changed by the changing task, the display control task controls displaying of the at least part of differences between the plurality of setting values of the executed job and the changed default setting values.

18. The information processing apparatus according to claim 17, wherein the changing task changes the stored default setting values in accordance with a reception of a user operation to register, as a new default setting values, a plurality of setting values that are set on a function screen of a function.

19. The information processing apparatus according to claim 16, wherein the display control task controls displaying of a home screen that includes a first area including at least one icon corresponding to each function and a second area including at least one history button on the display device.

20. The information processing apparatus according to claim 17, wherein the display control task displays, in the history button, the at least part of differences, and setting values to be displayed regardless of whether or not the default setting values are changed by the changing task.

\* \* \* \* \*